United States Patent
Suhama et al.

(10) Patent No.: US 7,893,637 B2
(45) Date of Patent: Feb. 22, 2011

(54) MOTOR DRIVE SYSTEM

(75) Inventors: Masayoshi Suhama, Toyota (JP);
Masaki Okamura, Toyota (JP); Eiji Sato, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 508 days.

(21) Appl. No.: 12/091,892

(22) PCT Filed: Oct. 26, 2006

(86) PCT No.: PCT/JP2006/321936

§ 371 (c)(1),
(2), (4) Date: Apr. 28, 2008

(87) PCT Pub. No.: WO2007/049810

PCT Pub. Date: May 3, 2007

(65) Prior Publication Data
US 2009/0243522 A1 Oct. 1, 2009

(30) Foreign Application Priority Data
Oct. 27, 2005 (JP) ............................. 2005-312663
Nov. 29, 2005 (JP) ............................. 2005-343991

(51) Int. Cl.
*H02P 3/14* (2006.01)
(52) U.S. Cl. .................. 318/376; 318/366; 318/434; 318/400.02; 318/717
(58) Field of Classification Search ............ 318/400.02, 318/400.15, 400.3, 711, 714, 717, 719–722, 318/366, 375, 376, 434; 180/271, 275, 65.1, 180/65.3, 309, 68.5
See application file for complete search history.

(56) References Cited

U.S. PATENT DOCUMENTS 5,549,172 A * 8/1996 Mutoh et al. ............... 180/65.1
6,989,644 B2 * 1/2006 Kim ....................... 318/400.31
7,034,482 B2 * 4/2006 Komiyama et al. .......... 318/376
7,112,931 B2 * 9/2006 Kitajima ..................... 318/114
7,723,945 B2 * 5/2010 Okamura .................... 318/805
2005/0189894 A1 9/2005 Komiyama

FOREIGN PATENT DOCUMENTS

| EP | 0 091 589 A2 | 10/1983 |
|---|---|---|
| JP | 5-137377 A | 6/1993 |
| JP | 9-98508 A | 4/1997 |
| JP | 10-150702 A | 6/1998 |

(Continued)

OTHER PUBLICATIONS

Eiji Sato, "High-Poser Motor Drive System for Hybrid Vehicle and Control Methods", Symposium Text (Evolving Electric Power Train Technology-Technical Trends on Electric Power Train Development for HEV, FCV, and EV-), Feb. 2004, p. 1/7-7/7.

*Primary Examiner*—Walter Benson
*Assistant Examiner*—Thai Dinh
(74) *Attorney, Agent, or Firm*—Sughrue Mion, PLLC

(57) ABSTRACT

In a drive system of an AC motor in which a motor current is feedback-controlled, a motor current command is produced in a normal operation according to a torque command value on an optimum efficiency characteristic line so as to select an optimum current phase maximizing an output torque with a constant motor current amplitude. Conversely, when the AC motor produces an excessively generated power exceeding a regeneratable power quantity of the AC motor, a consuming operation is performed for intentionally increasing the power loss in the AC motor. In the consuming operation, the motor current command is produced according to the torque command value on a loss increase characteristic line to change the current phase from the above optimum value. Thereby, the power loss in the AC motor can be increased to consume the surplus power without causing instability in the motor control.

13 Claims, 22 Drawing Sheets

FOREIGN PATENT DOCUMENTS

| | | |
|---|---|---|
| JP | 2001-95300 A | 4/2001 |
| JP | 2003-134602 A | 5/2003 |
| JP | 2003-259505 A | 9/2003 |
| JP | 2004-64840 A | 2/2004 |
| JP | 2004-328961 A | 11/2004 |
| JP | 2005-51887 A | 2/2005 |
| JP | 2005-102385 A | 4/2005 |
| JP | 2005-253126 A | 9/2005 |
| RU | 1778906 A1 | 11/1992 |
| RU | 2193814 C2 | 11/2002 |
| RU | 2231200 C2 | 6/2004 |
| RU | 2262794 C2 | 10/2005 |

\* cited by examiner

| | | MOTOR LOSS INCREASE SETTING VALUE Mlcom | | | |
|---|---|---|---|---|---|
| | | 0 | L1 | L2 | L3 |
| TORQUE COMMAND VALUE Trqcom | ⋮ | ⋮ | ⋮ | ⋮ | ⋮ |
| | T2 | (Idcom,Iqcom) ← P2o | (Idcom,Iqcom) ← P2a | (Idcom,Iqcom) ← P2b | (Idcom,Iqcom) ← P2c |
| | ⋮ | ⋮ | ⋮ | ⋮ | ⋮ |
| | T1 | (Idcom,Iqcom) ← P1o | (Idcom,Iqcom) ← P1a | (Idcom,Iqcom) ← P1b | (Idcom,Iqcom) ← P1c |
| | ⋮ | ⋮ | ⋮ | ⋮ | ⋮ |

TBL

FIG.13

| CONTROL METHOD | SINUSOIDAL PWM | OVERMODULATION PWM | RECTANGULAR WAVE (1 PULSE) |
|---|---|---|---|
| | MOTOR CURRENT CONTROL | | RECTANGULAR WAVE VOLTAGE CONTROL (MAGNETIC FIELD-WEAKENING CONTROL) |
| OUTPUT VOLTAGE WAVEFORM OF INVERTER | BASIC WAVE COMPONENT | BASIC WAVE COMPONENT | BASIC WAVE COMPONENT |
| MODULATION FACTOR | 0~0.61 | 0.61~0.78 | 0.78 |
| FEATURE | SMALL TORQUE VARIATIONS | IMPROVED OUTPUT IN MIDDLE SPEED RANGE | IMPROVED OUTPUT IN HIGH SPEED RANGE |

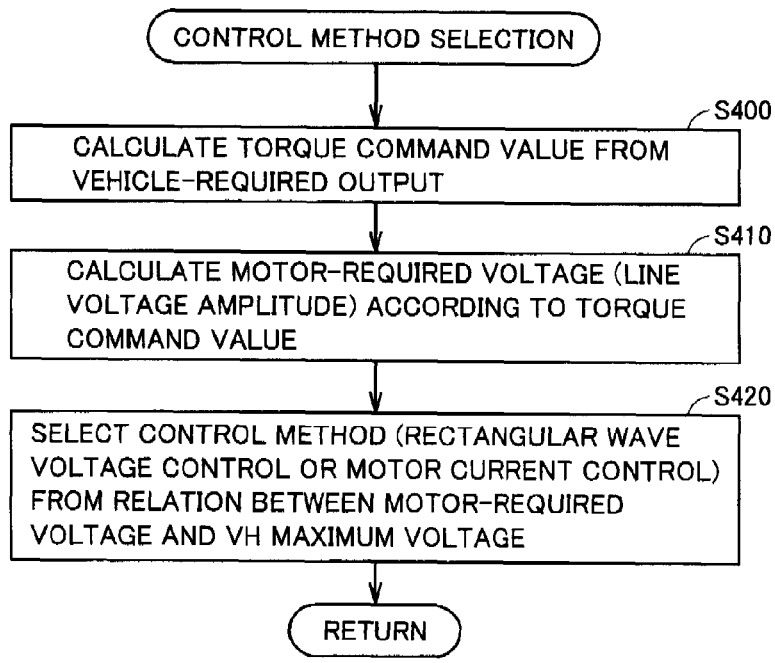

FIG.14

| CURRENT OPERATION POINT | CONSUMPTION SURPLUS POWER INCREASABLE WITHIN PREDETERMINED TIME |
|---|---|
| ⋮ | ⋮ |
| (TORQUE, CURRENT PHASE) | Ptm1 (Ptm2) |
| ⋮ | ⋮ | though.

MOTOR DRIVE SYSTEM

TECHNICAL FIELD

The present invention relates to a motor drive system, and particularly to a motor drive system controlling drive of an AC motor by feedback control of a motor current.

BACKGROUND ART

A structure including a rechargeable DC power supply, an inverter and an AC motor has been known as a typical motor drive system. This motor drive system is configured as follows. During power running of the AC motor, a power supplied from the DC power supply drives and controls the AC motor so that the power can be bidirectionally supplied and received between the DC power supply, the inverter and the AC motor. Also, during a regenerative operation of the AC motor, the inverter converts the regenerative power supplied from the AC motor into a DC voltage, which can be used for charging the DC power supply by it.

In this motor drive system, the AC motor may generate a power exceeding an acceptable power of the input side (DC power supply side) and thereby may generate a surplus power. In this case, an excessively large regenerative power may generate an overvoltage inside the motor drive system. Therefore, such a control structure has been required that increases power consumption in the AC motor when require, and thereby suppresses the generative power on the input side.

In connection with this, Japanese Patent Laying-Open No. 2005-102385 (Patent Document 1) has disclosed a control structure for reducing the regenerative power. This control structure superimposes high-frequency components on d- and q-axis current command values, and thereby increases high-frequency components of a motor current flowing through an AC motor. This structure increases a core loss of the AC motor and thereby lowers drive efficiency so that the regenerative power from the AC motor is suppressed. Consequently, it is possible in the regenerative operation of the AC motor to suppress rising of a DC voltage (DC link voltage) on the input side of the inverter.

However, Patent Document 1 has not disclosed a control structure for causing the output torque to follow the torque command value when the torque command value changes during consumption control of the regenerative power described above.

Further, in the control structure disclosed in Patent Document 1, since the high-frequency components are added to the motor current, the amount of the power consumption continuously changes when viewed on extremely short time units, and the operation of the whole control system may become instable. Therefore, the high-frequency current amount that can be superimposed, i.e., the amount of power loss in the motor can increase only to a limited extent in view of the stabilization of the AC motor control. Accordingly, it is difficult to ensure a large surplus power that can be consumed while keeping torque controllability in the AC motor.

DISCLOSURE OF THE INVENTION

The invention has been made for overcoming the above problems, and an object of the invention is to provide a motor drive system having a control structure that can consume a surplus power while performing torque-following control, without causing instability in motor control.

A motor drive system according to the invention is configured for driving an AC motor, and includes a motor drive circuit, and motor control means for controlling an operation of the motor drive circuit. The motor drive circuit is capable of bidirectionally supplying and receiving a power to and from the AC motor, and supplies a drive power to the AC motor. The motor control means performs a consuming operation of consuming a surplus power determined depending on a state of the motor drive system by the AC motor, and performs a follow-up operation of causing an output torque to follow changes in torque command value while keeping the consuming operation when the torque command value to the AC motor changes during the consuming operation.

According to the above motor drive system, the consuming operation can consume the surplus power in the AC motor. Further, even when the torque command value to the AC motor changes during the consuming operation, the output torque control following the changes in torque command value can be performed while keeping the consuming operation. Therefore, even when a torque requested to the AC motor changes, the output torque can follow the torque command value, and a surplus power can be consumed when necessary (e.g., when the AC motor instantaneously generates a large amount of power). Consequently, while keeping the torque controllability of the AC motor, the motor drive system can prevent generation of an overvoltage in the system which may be caused by an excessive regenerative power from the AC motor. Further, the surplus power can be consumed in either of the regeneration and the power running, i.e., independently of the operation state of the AC motor.

Preferably, in the motor drive system of the invention, the motor control means drives the AC motor with a current phase relatively lowering drive efficiency of the AC motor according to increase in determined surplus power in the consuming operation.

According to the above motor drive system, since the surplus power of the AC motor is consumed by changing the current phase of the motor current, the possibility of destabilizing the motor controllability is lower than that of a control structure that consumes the surplus power by superimposing high-frequency components on a motor current. Therefore, it is possible to reduce a margin required in a capacitor and therefore to reduce a manufacturing cost, and it is also possible to ensure a large surplus power that can be consumed by the AC motor.

Preferably, in the motor drive system of the invention, the motor control means has power estimating means for estimating a power generated by the AC motor based on the a rotation angular speed of the AC motor and the torque command value, and determines the surplus power consumed by the consuming operation according to the generated power estimated by the power estimating means.

The motor drive system described above estimates the generated power based on the rotational angular speed of the AC motor and the torque command value, and thereby can easily and reliably grasp the surplus power in the AC motor. Therefore, the system can easily detect the state in which the regenerative power must be suppressed by the surplus power consumption in the AC motor.

Preferably, in the motor drive system of the invention, the motor drive circuit is capable of bidirectionally supplying and receiving the power to and from a rechargeable DC power supply. The motor drive system further includes a voltage detector detecting a voltage on an interconnection electrically connecting the motor drive circuit and the DC power supply together. The motor control means determines the surplus power consumed by the consuming operation according to the voltage detected by the voltage detector.

According to the motor drive system described above, when the surplus regenerative power from the AC motor raises the voltage (DC link voltage) on the interconnection between the motor drive circuit and the DC voltage, the surplus power consumption in the AC motor can be increased to suppress the regenerative power from the AC motor. Therefore, generation of the overvoltage in the motor drive system can be reliably prevented.

Preferably, in the motor drive system of the invention, the AC motor is mounted on the vehicle, and an output shaft of the AC motor is connected to a wheel of the vehicle for torque transmission. Further, the motor control means determines the surplus power to be consumed by the consuming operation according to a braking force required in the vehicle.

In the foregoing motor drive system, when the AC motor is used as a vehicle driving motor, the surplus power consumption in the AC motor can increase an inertia moment according to the braking force required in the vehicle. Thereby, a driver can obtain a more reliably deceleration feeling owing to the effect of lowering the rotation speed of the AC motor according to the increase in inertia moment. Further, the vehicle braking force can be produced even when the regenerative brake in the AC motor is not available due to charging restrictions on the input side and the like. Consequently, it is possible to improve drive feeling and braking capability of the vehicle equipped with the motor drive system.

Preferably, in the motor drive system according of the invention, the motor control means has characteristic storing means, and produces a current command according to the torque command value and the determined surplus power based on a correlation stored in the characteristic storing means. The characteristic storing means stores in advance the correlation between the torque command value and the current command corresponding to the surplus power consumption of the same magnitude in the AC motor.

According to the motor drive system described above, based on the prestored correlation, the current command can cause the AC motor to output a torque according to the torque command value and to consume the surplus power, and this current command can be changed continuously even when changes occur in torque command value and/or surplus power to be consumed. Therefore, even when the torque command value changes the surplus power consuming operation, the follow-up control of the output torque of the AC motor can be performed.

Preferably, in the motor drive system of the invention, the motor control means includes loss increase setting means, current command producing means and current control means. The loss increase setting means sets a motor loss command indicating a power loss to be increased in the AC motor corresponding to the determined surplus power. The current command producing means produces a current command for a motor current passing through the AC motor according to the torque command value of the AC motor and the motor loss command determined based on the loss increase setting means. The current control means controls the operation of the motor drive circuit to generate the motor current in accordance with the current command produced by the current command producing means. Further, the current command producing means produces the current command such that the output torque of the AC motor matches with the torque command value and drive efficiency of the AC motor relatively lowers according to increase in power loss caused by the motor loss command.

According to the above motor drive system in which the current control means drives the AC motor by the feedback control of the motor current, the command value (current command value) of the motor current control is set to generate the power loss in the AC motor according to the motor loss command, and thereby the foregoing consuming operation of consuming an arbitrary surplus power can be performed. Therefore, even when the torque requested to the AC motor changes, the output torque can follow the command value, and the surplus power can be consumed by increasing the power loss in the AC motor, when necessary. Consequently, it is possible to generate an overvoltage in the motor drive system, which may be caused by supply of the excessive regenerative power from the AC motor, while keeping the torque controllability of the AC motor.

Further preferably, in the motor drive system of the invention, the motor control means further includes rectangular wave voltage control means, control mode selecting means and control mode correcting means. The rectangular wave voltage control means controls the operation of the motor drive circuit to apply a rectangular wave voltage of a phase depending on the torque command value to the AC motor. The control mode selecting means selects one of the current control means and the rectangular wave voltage control means according to the operation state of the AC motor. When the control mode select means selects the rectangular wave voltage control means, the control mode correcting means cancels the selection by the control mode select means and selects the current control means according to the motor loss command determined by the loss increase setting means. Particularly, when the control mode correcting means selects the current control means, the current command producing means produces the current command in a region of drive efficiency of the AC motor lower than that achieved by the motor drive using the rectangular wave voltage control means.

The above motor drive system can selectively use the general motor current control and the rectangular wave voltage control for ensuring the motor output in a high speed range, and thereby can increase an operable range of the AC motor. Further, when the surplus power occurs in the AC motor during the rectangular wave voltage control, the motor current control that produces the current command in the region of the drive efficiency lower than that during the rectangular wave voltage control can be selected instead of the rectangular wave voltage control. Thereby, the AC motor can consume the surplus power in any portion of the enlarged operable region. Therefore, it is possible to ensure the output in a high speed range owing to the employment of the rectangular wave voltage control as well as to prevent overvoltage that may generate in the motor drive system due to excessive increase in regenerative power from the AC motor.

Preferably, the motor drive system of the invention drives a plurality of the AC motors, and the motor drive circuit and the motor control means are arranged corresponding to each of the AC motors. Each of the motor drive circuits is capable of bidirectionally supplying and receiving the power to and from a rechargeable common power supply. Further, the motor drive system further includes distributing means for setting consumption surplus powers in the plurality of the AC motors, respectively, such that a whole of the plurality of AC motors consumes the surplus power. Each of the motor control means controls the corresponding AC motor to perform the consuming operation of consuming the corresponding one of the consumption surplus powers determined by the distributing means.

The above motor drive system which drives the plurality of AC motors can execute the consuming operation in each AC motor such that the whole of the plurality of AC motors consumes the surplus power determined in view of the power balance in the whole system. Therefore, it is possible to suppress the surplus power consumed per AC motor and therefore to reduce a load on each AC motor, and the AC motors can consume the surplus power as a whole. Thereby, it is possible to prevent generation of the overvoltage in the motor drive system with consideration totally giving to the operation states of the plurality of AC motors. In particular, even when one or some of the motors are executing the regenerative operation (i.e., power generating operation), and the other motor(s) are performing the power running, it is possible to prevent the plurality of AC motors from generating the surplus power as a whole, and to prevent generation of the overvoltage in the motor drive system. Also, the consumable surplus power can be reliably increased as compared with the case where one or some of the AC motors concentratedly consume the surplus power.

Further preferably, in the motor drive system of the invention, the distributing means includes upper limit setting means for calculating the consumable surplus powers of the plurality of AC motors, respectively based on a present operation state in the corresponding AC motor, and distribution determining means for setting the consumption surplus power in respective the AC motors such that each consumption surplus power is within a range of the corresponding consumable surplus power calculated by the upper limit setting means.

The above motor drive system can distribute the consumption surplus power in a consumable range according to the present operation state to each AC motor. Therefore, the plurality of AC motors can consume the surplus power while keeping a balance between them according to the operation states (regenerative operation and power running) of the respective AC motors.

Further preferably, in the motor drive system of the invention, the distributing means includes distribution determining means for setting the consumption surplus powers in the plurality of AC motors, respectively, in view of temperatures of the plurality of AC motors.

The above motor drive system monitors increase in temperature of the motor generator that occurs according to the surplus power consumption. Thereby, it is possible to avoid execution of such a surplus power consuming operation that raises the motor temperature to a high temperature range causing changes in motor characteristic.

Further preferably, in the motor drive system of the invention, the distributing means includes upper limit setting means for calculating, for the respective AC motors, the surplus powers each being consumable within a predetermined time based on a present operation state of the corresponding AC motor, and distribution determining means for setting the consumption surplus powers in respective the AC motors such that each consumption surplus power is within a range of the corresponding surplus power being consumable within the predetermined time calculated by the upper limit setting means.

The above motor drive system can distribute the surplus power to each AC motor within the range that allows increase within the predetermined time in the present operation state. Therefore, the system can consume the whole surplus power within a short time according to the operation states (regenerative operation and power running) of the respective AC motors.

Particularly, in the above structure, the plurality of AC motors include a drive motor generating a wheel drive force of a vehicle, and a non-drive motor not directly generating the wheel drive power. The distributing means sets consumption surplus powers in the respective AC motors such that the non-drive motor consumes the surplus power on a priority basis.

In the above motor drive system, since the non-drive motor that does not directly generates the wheel drive power is used on a priority basis to consume the surplus power, it is possible to suppress a possibility that the surplus power consuming operation of the AC motors affects a driving performance of the vehicle.

Therefore, the motor drive system of the invention can consume the surplus power while performing the torque follow-up control without destabilizing the motor control. Consequently, the system can prevent the generation of the overvoltage in it due to supply of an excessive regenerative power from the AC motor.

BRIEF DESCRIPTION OF THE DRAWINGS

FIG. 13 illustrates a control method used in a motor drive system according to a third embodiment.

FIG. 14 is a flowchart illustrating a method of selecting the control method in the motor drive system according to the third embodiment.

BEST MODES FOR CARRYING OUT THE INVENTION

Embodiments of the invention will now be described with reference to the drawings. The same or corresponding portions bear the same reference numbers, and description thereof is not repeated in principle.

First Embodiment

Figure 1:
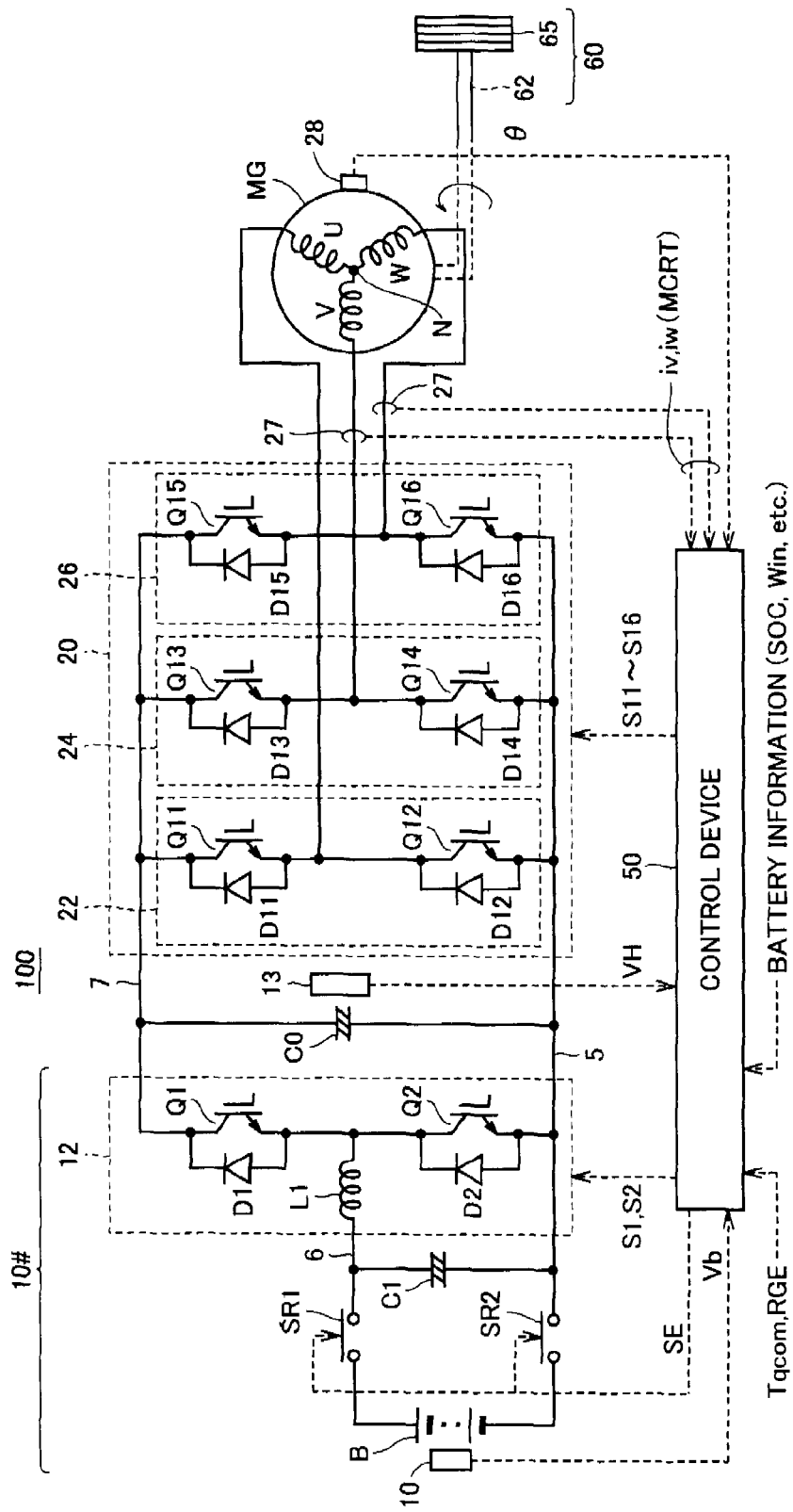
FIG. 1 shows a whole structure of a motor drive system according to an embodiment of the invention.

FIG. 1 shows a whole structure of a motor drive system according to an embodiment of the invention.

Referring to FIG. 1, a motor drive system 100 according to an embodiment of the invention includes a DC voltage generating unit 10#, a smoothing capacitor C0, an inverter 20, a control device 50 and an AC motor MG.

A load 60 is driven to rotate by an output torque of AC motor MG. For example, load 60 includes a drive shaft 62 coupled for transmitting an output torque of AC motor MG, and a drive wheel 65 that is driven to rotate according to a rotation of drive shaft 62.

As described above, AC motor MG is used typically as a driving electric motor for driving the drive wheels of a hybrid car or an electric car. Alternatively, AC motor MG may be configured to have a function of an electric generator that is driven by an engine, and may be configured to have both the functions of the electric motor and the generator such that regenerative power generation is performed by generating an output torque in a direction opposite to a rotating direction of drive wheel 65. Further, AC motor MG may be arranged in a hybrid car so that it may operate as an electric motor with respect to an engine for starting the engine.

DC voltage generating unit 10# includes a DC power supply B, system relays SR1 and SR2, a smoothing capacitor C1 and a step-up/down converter 12.

DC power supply B is formed of a secondary battery of nickel hydrogen, lithium ion or the like, or a storage battery device such as an electric double layer capacitor. A voltage sensor 10 senses DC voltage Vb output by DC power supply B. Voltage sensor 10 outputs detected DC voltage Vb to control device 50.

System relay SR1 is connected between a positive electrode terminal of DC power supply B and a power line 6, and system relay SR2 is connected between a negative electrode terminal of DC power supply B and a ground line 5. System relays SR1, SR2 are turned on/off by a signal SE from control device 50. More specifically, system relays SR1, SR2 are turned on by signal SE at H (logic high) level from control device 50 and turned off by signal SE at L (logic low) level from control device 50. Smoothing capacitor C1 is connected between power line 6 and ground line 5.

Step-up/down converter 12 includes a reactor L1, and power semiconductor switching elements Q1 and Q2.

Power switching elements Q1 and Q2 are connected in series between a power line 7 and ground line 5. The on/off of power switching elements Q1 and Q2 is controlled by switching control signals S1 and S2 provided from control device 50.

In the embodiments of the present invention, an IGBT (Insulated Gate Bipolar Transistor), a power MOS (Metal Oxide Semiconductor) transistor, a power bipolar transistor or the like may be used as the power semiconductor switching element (which will be simply referred to as "switching element" hereinafter). Antiparallel diodes D1 and D2 are arranged with respect to switching elements Q1 and Q2.

Reactor L1 is connected between a connection node of switching elements Q1 and Q2 and power line 6. Furthermore, smoothing capacitor C0 is connected between power line 7 and ground line 5.

Inverter 20 is formed of a U-phase arm 22, a V-phase arm 24 and a W-phase arm 26 provided in parallel between power line 7 and ground line 5. Each phase arm is formed of switching elements connected in series between power line 7 and ground line 5. For example, U-phase arm 22 is formed of switching elements Q11 and Q12, V-phase arm 24 is formed of switching elements Q13 and Q14, and W-phase arm 26 is formed of switching elements Q15 and Q16. In addition, antiparallel diodes D11-D16 are connected to switching elements Q11-Q16, respectively. The on/off of switching elements Q11-Q16 is controlled by switching control signals S11-S16 provided from control device 50.

An intermediate point of each phase arm is connected to a phase end of each phase coil of AC motor MG. In other words, AC motor MG is a three-phase permanent magnet motor and is formed such that ends on one side of three, U, V and W-phase coils are commonly connected to a neutral point N. Furthermore, the other end of each phase coil is connected to the intermediate point of the switching element of phase arm 22, 24 or 26.

In a step-up operation, step-up/down converter 12 supplies to inverter 20 a DC voltage VH (this DC voltage equivalent to an input voltage to inverter 20 is also referred to as "system voltage VH" hereinafter) generated by boosting DC voltage Vb supplied from DC power supply B. This system voltage corresponds to the DC link voltage of the inverter that is referred to in Patent Document 1.

More specifically, a duty ratio (on-period ratio) of switching elements Q1 and Q2 are set in response to switching control signals S1 and S2 provided from control device 50, and the step-up ratio depends on the duty ratio.

In addition, at a time of step-down operation, step-up/down converter 12 lowers the DC voltage (system voltage) supplied from inverter 20 through smoothing capacitor C0, and supplies it to charge DC power supply B. More specifically, the period during which only switching element Q1 is turned on and the period during which both switching elements Q1 and Q2 are turned off are alternately provided in response to switching control signals S1 and S2 from control device 50, and the step-down ratio depends on the duty ratio of the aforementioned ON period.

Smoothing capacitor C0 smoothens the DC voltage from step-up/down converter 12 and supplies the smoothed DC voltage to inverter 20. A voltage sensor 13 detects the voltage between the opposite ends of smoothing capacitor C0, that is, the system voltage and outputs the detected value VH to control device 50.

When a torque command value of AC motor MG is positive (Tqcom>0), inverter 20 converts the DC voltage supplied from smoothing capacitor C0 into an AC voltage by the switching operation of switching elements Q11-Q16 responsive to switching control signals S11-S16 from control device 50 and drives AC motor MG to output a positive torque. On the other hand, when the torque command value of AC motor MG is zero (Tqcom=0), inverter 20 converts the DC voltage into an AC voltage by the switching operation responsive to switching control signals S11-S16 and drives AC motor MG so that torque becomes zero. Thus, AC motor MG is driven to generate zero or positive torque designated by torque command value Tqcom.

Furthermore, at a time of regenerative braking of the hybrid car or the electric car equipped with motor drive system 100, torque command value Tqcom of AC motor MG is set negative (Tqcom<0). In this case, inverter 20 converts the AC voltage generated by AC motor MG into a DC voltage by the switching operation responsive to switching control signals S11-S16 and supplies the converted DC voltage (system voltage) to step-up/down converter 12 through smoothing capacitor C0. It is noted that regenerative braking referred to herein includes braking involving regenerative power generation in the case where the foot brake pedal is operated by the driver driving the hybrid car or the electric car, and decelerating the vehicle (or halting acceleration) while causing the regenerative power generation by releasing the accelerator pedal during travel without operating the foot brake pedal.

A current sensor 27 detects a motor current MCRT flowing in AC motor MG and outputs the detected motor current to control device 50. Here, since the sum of instantaneous values of three phase currents iu, iv and iw is zero, current sensor 27 may be arranged to detect only motor currents of two phases (for example, V-phase current iv and W-phase current iw), as shown in FIG. 1.

A rotational angle sensor (resolver) 28 detects a rotational angle θ of a rotor (not shown) of AC motor MG and sends detected rotational angle θ to control device 50. In control device 50, a revolution speed Nmt (angular rotation speed ω) of AC motor MG is calculated based on rotational angle θ.

Control device 50 controls the operations of inverter 20 such that AC motor MG outputs a torque according to torque command value Tqcom by the method described later, based on torque command value Tqcom input from an electronic control unit (ECU) provided outside, battery voltage Vb detected by voltage sensor 10, system voltage VH detected by voltage sensor 13, motor currents MCRT provided from current sensor 27, and rotational angle θ provided from rotational angle sensor 28. In other words, control device 50 produces switching control signals S11-S16 for controlling inverter 20 as described above are generated and outputs them to inverter 20.

At the time of boosting or stepping up operation of step-up/down converter 12, control device 50 calculates the command value of system voltage VH according to the operation state of AC motor MG, and generates switching control signals S1 and S2 providing output voltage VH of the voltage command value based on this command value and the detected value of system voltage VH sensed by voltage sensor 13.

In addition, when control device 50 receives from external ECU a control signal RGE indicating that the hybrid car or the electric car enters the regenerative braking mode, it generates switching control signals S11-S16 and outputs the same to inverter 20 so that the AC voltage generated by AC motor MG is converted into DC voltage. Thus, inverter 20 converts the AC voltage generated in AC motor MG into the DC voltage to be supplied to step-up/down converter 12.

Further, in response to control signal RGE, control device 50 generates a switching control signals S1 and S2 for stepping down the DC voltage supplied from inverter 20, and outputs the same to step-up/down converter 12. In this manner, the regenerative power from AC motor MG is used for charging DC power supply B.

Furthermore, when motor drive system 100 is to be started or stopped, control device 50 generates signal SE for turning on/off system relays SR1 and SR2, and outputs the same to system relays SR1, SR2.

Further, control device 50 receives information about DC power supply B such as an SOC (State of Charge) and an inputtable power quantity Win indicating the charging restriction. Thereby, control device 50 controls the consumed power and the generated power (regenerative power) in motor drive system 100.

The drive control of AC motor MG in motor drive system 100 is basically performed by feedback control of motor current MCRT as will be described below.

Figure 2:
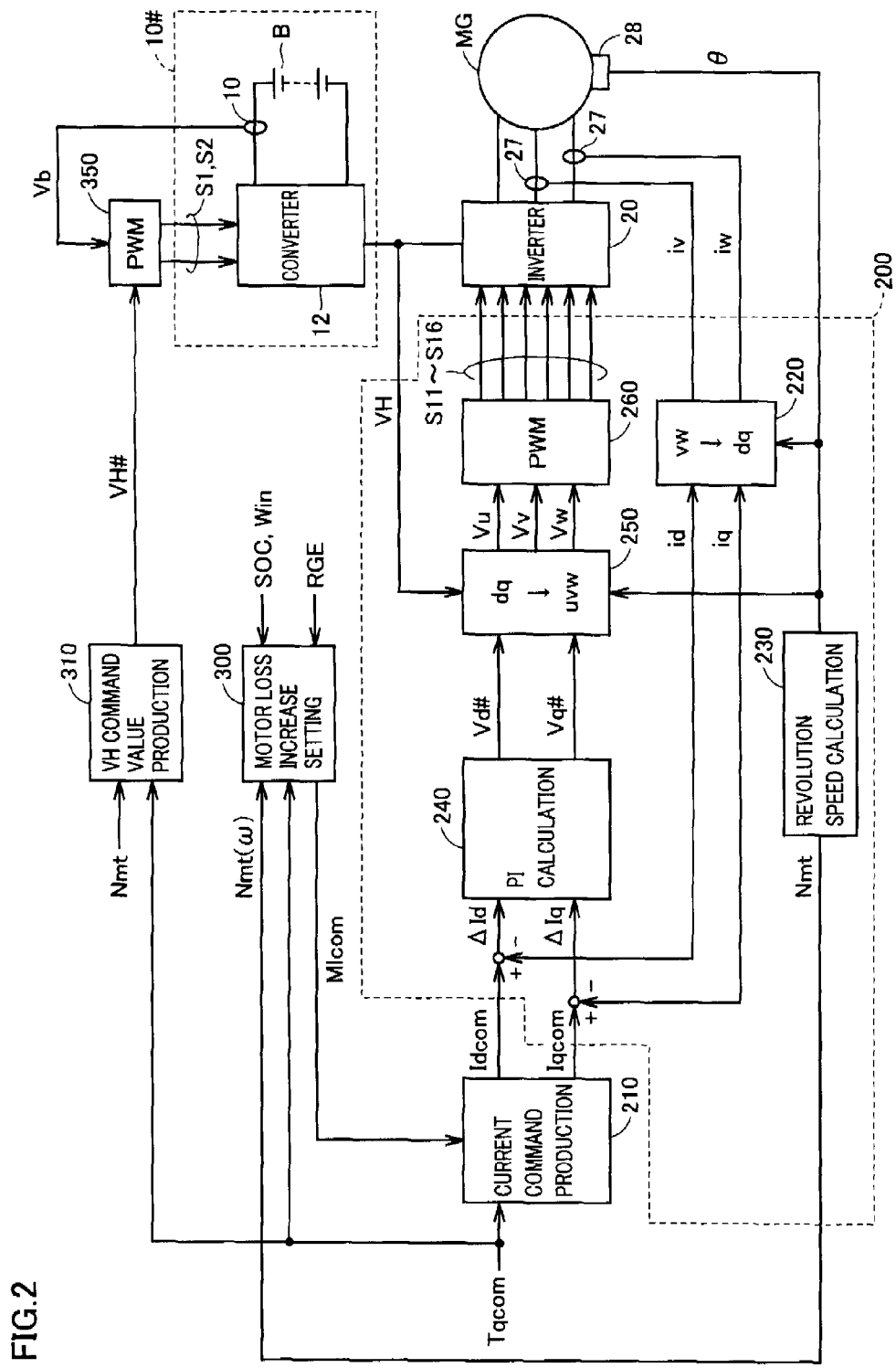
FIG. 2 is a block diagram illustrating motor current control of an AC motor shown in FIG. 1.

FIG. 2 is a control block diagram of the motor current control executed by control device 50 according to a Pulse Width Modulation (PWM) method.

Referring to FIG. 2, a current control block 200 includes coordinate transforming units 220 and 250, a revolution speed calculating unit 230, a PI calculating unit 240 and a PWM signal producing unit 260. Further, current control block 200 includes a current command producing unit 210 providing a current command to current control block 200, and a motor loss increase setting unit 300 that provides a power loss to be increased in AC motor MG to current command producing unit 210.

Motor loss increase setting unit 300 receives the state of charge SOC of DC power supply B, inputtable power quantity Win and control signal RGE as well as operation conditions of AC motor MG, i.e., torque command value Tqcom and motor revolution speed Nmt (angular rotation speed ω), and generates a motor loss increase setting value Mlcom.

Current command producing unit 210 produces current command values Idcom and Iqcom according to torque command value Tqcom and motor loss increase setting value Mlcom of AC motor MG based on a table or the like that is prepared in advance.

Coordinate transforming unit 220 performs coordinate transformation (three phases to two phases) using rotational angle θ of AC motor MG detected by rotational angle sensor 28, and thereby calculates d-axis current id and q-axis current iq based on motor current MCRT (iv, iw, iu=−(iv+iw)) detected by current sensor 27. Revolution speed calculating unit 230 calculates revolution speed Nmt of AC motor MG based on the output from rotational angle sensor 28.

PI calculating unit 240 receives a deviation ΔId (ΔId=Idcom−id) from a command value of the d-axis current and a deviation ΔIq (ΔIq=Iqcom−iq) from a command value of q-axis current. PI calculating unit 240 performs PI calculation with a prescribed gain to obtain a control deviation for each of d- and q-axis current deviations ΔId and ΔIq, and generates d- and q-axis voltage command values Vd# and Vq# corresponding to these control deviations, respectively.

Coordinate transforming unit 250 performs coordinate transformation (two phases to three phases) using rotational angle θ of AC motor MG, and thereby converts d- and q-axis voltage command values Vd# and Vq# into respective phase voltage command values Vu, Vv and Vw of U-, V- and W-phases. Here, system voltage VH is also reflected in the conversion from d- and q-axis voltage command values Vd# and Vq# into respective phase voltage command values Vu, Vv and Vw.

PWM signal producing unit 260 produces switching control signals S11-S16 shown in FIG. 1 based on the comparison between voltage command values Vu, Vv and Vw in the respective phases and a prescribed carrier wave. The switching of inverter 20 is controlled according to switching control signals S11-S16 produced by current control block 200, so that AC voltage for outputting a torque according to torque command value Tqcom is applied to AC motor MG.

A VH command value producing unit 310 produces a control command value VH# of system voltage VH (also referred to as "voltage command value VH#" hereinafter) depending on torque command value Tqcom and revolution speed Nmt of AC motor MG.

A PWM signal producing unit 350 produces switching control signals S1 and S2, according to the prescribed PWM control method, so that the output voltage of converter 12 attains voltage command value VH#, based on battery voltage Vb detected by voltage sensor 10 and present system voltage VH.

In the motor drive system according to the embodiment, current command producing unit 210 reflects motor loss increase setting value Mlcom in production of current command values Idcom and Iqcom used for outputting the torque from AC motor MG according to torque command value Tqcom, as will be described later in detail.

Figures 3, 4:
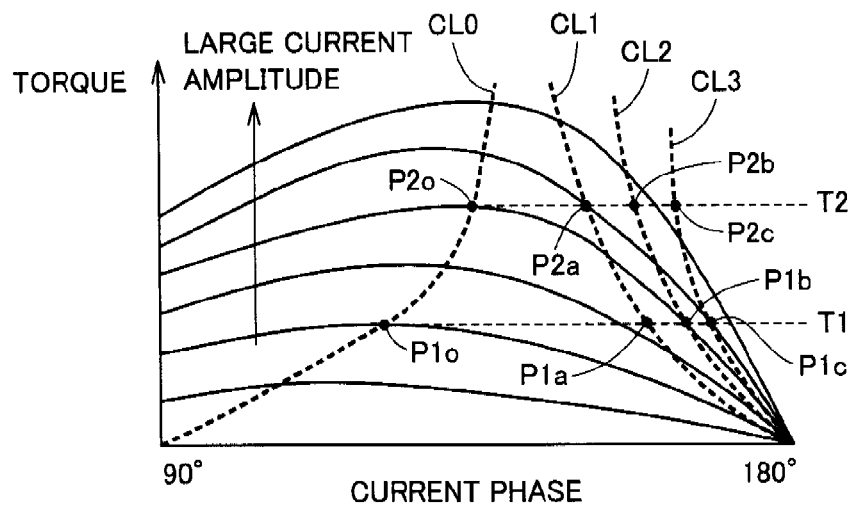
FIG. 3 is a conceptual diagram illustrating a relationship between a motor current phase and an output torque of the AC motor MG shown in FIG. 1.
FIG. 4 illustrates a configuration example of a table for setting a motor current command value according to a torque command value and a motor loss increase setting value.

FIG. 3 is a conceptual diagram illustrating a relationship between a motor current phase and an output torque of AC motor MG.

In FIG. 3, solid lines are characteristic lines representing changes that occur in output torque when the current phase changes with the motor current amplitude kept constant. As can be understood from these characteristic lines, there is a current phase achieving a maximum output torque, i.e., a maximum motor efficiency in connection with each motor current amplitude. An optimum efficiency characteristic line CL0 is obtained by connecting the maximum efficiency operation points corresponding to the respective current amplitudes.

Current command producing unit 210 shown in FIG. 2 basically determines the amplitude and phase of the motor current to set the current operation point on optimum efficiency characteristic line CL0 with respect to the command value of the output torque, i.e., torque command value Tqcom, and generates current command values Idcom and Iqcom for d- and q-axes so that the current amplitude and current phase thus determined may be achieved.

Also, loss increase characteristic lines CL1-CL3 can be obtained as sets of the current operation points that are obtained by shifting the current phase from the optimum point for generating certain quantities of lower loss in AC motor MG. Thus, each loss increase characteristic line can be defined as the set of the current operation points where the motor losses of the same quantity occur corresponding to each current amplitude.

Consequently, one current operation point can be selected from the current phase-output torque characteristics shown in FIG. 3 according to torque command value Tqcom and motor loss increase setting value Mlcom.

For example, as illustrated in FIG. 3, when torque command value Tqcom is equal to T1, current operation points P1o, P1a, P1b and P1c are obtained for motor loss increase setting values Mlcom equal to 0, L1, L2 and L3, respectively. Likewise, when torque command value Tqcom is equal to T2, current operation points P2o, P2a, P2b and P2c can be set for obtaining motor loss increase setting values Mlcom equal to 0, L1, L2 and L3, respectively.

As illustrated in FIG. 4, a reference table TBL is prepared in advance. Table values thereof are formed of sets (Idcom, Iqcom) of d- and q-axis current command values corresponding to respective current operation points according to torque command value Tqcom and motor loss increase setting value Mlcom. Current command producing unit 210 refers to table TBL according to torque command value Tqcom and motor loss increase setting value Mlcom, and thereby can produce current command values Idcom and Iqcom for outputting the torque according to torque command value Tqcom while increasing the power loss according to motor loss increase setting value Mlcom.

In this manner, it is possible to set arbitrarily the operation (Mlcom=0) causing AC motor MG to operate with optimum efficiency and the consuming operation (Mlcom>0) of consuming an arbitrary surplus power by increasing the power loss in AC motor MG according to the set value.

Figure 5:
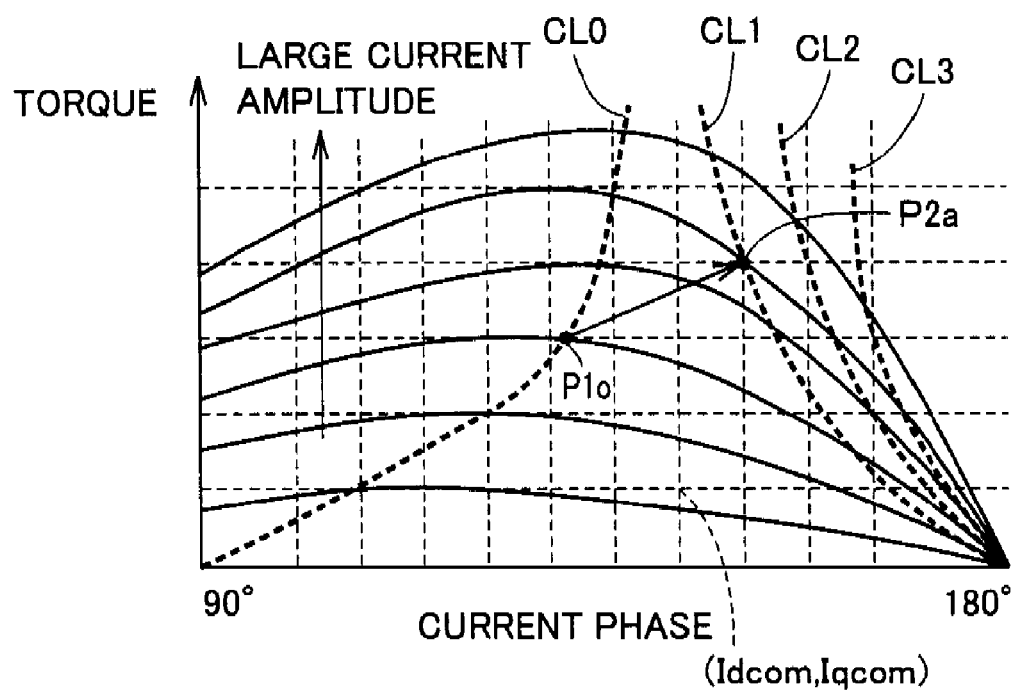
FIG. 5 illustrates setting of current operation points corresponding to the current phase-output torque characteristic diagram of FIG. 3.

Alternatively, as illustrated in FIG. 5, it is possible to prepare in advance a reference table of which table values are formed of sets of current command values (Idcom, Iqcom) corresponding to respective points on a two-dimensional plane of the current phase-output torque characteristics handled as candidates of the current operation points. In this case, current command producing unit 210 determines the current operation point to be selected from among the candidates on FIG. 5 according to torque command value Tqcom and motor loss increase setting value Mlcom. This method can produce the current command value similarly to the method illustrated in FIG. 4.

Figure 6:
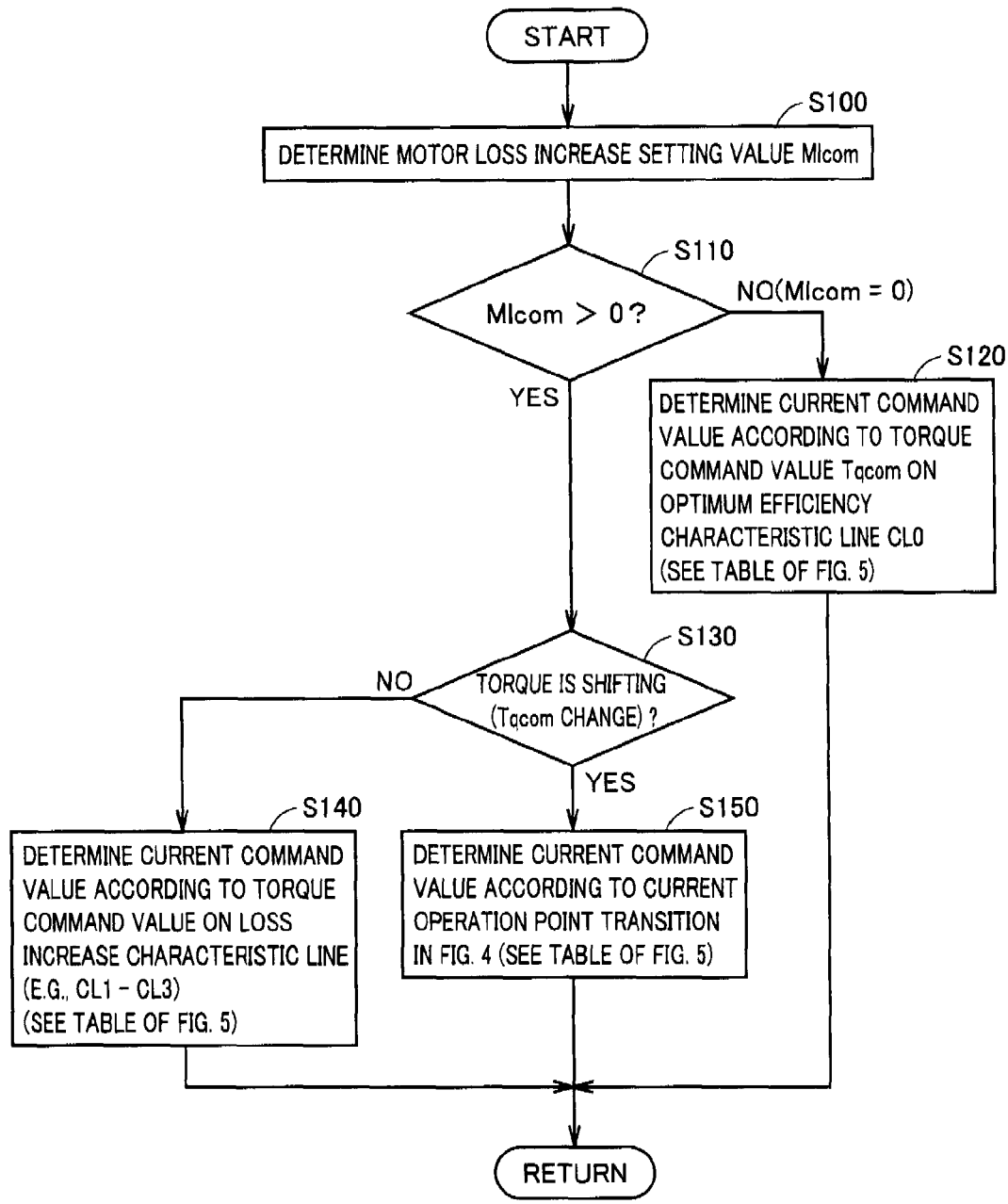
FIG. 6 is a flowchart illustrating a determination routine for a current control command value in the motor drive system according to the first embodiment.

FIG. 6 is a flowchart illustrating a determination routine for the current control command value in the motor drive system according to the first embodiment.

Referring to FIG. 6, control device 50 determines, according to the operation state of AC motor MG, the surplus power to be consumed by AC motor MG, i.e., the power loss to be increased in step S100. More specifically, control device 50 determines motor loss increase setting value Mlcom corresponding to the power loss quantity to be additionally consumed corresponding to the surplus power in AC motor MG by lowering the motor drive efficiency. The processing in step S100 corresponds to the operation of motor loss increase setting unit 300 shown in FIG. 2.

For example, in step S100, when AC motor MG executes the regenerative operation according to control signal RGE, the charging to DC power supply B (the secondary battery)

may be restricted based on the state of charge (i.e., SOC) and inputtable power quantity Win, in which case (Mlcom>0) is set. Thus, motor loss increase setting value Mlcom is determined in view of the operation state of AC motor MG (i.e., in view of whether the regenerative operation is being performed or not, and an estimated generated power quantity in AC motor MG reflecting grip/slip and the like of the wheels) and a state of a supply target of the regenerative power from AC motor MG.

Control device 50 determines in step S110 whether motor loss increase setting value Mlcom determined in step S100 is larger than Mlcom (Mlcom>0) or not. When value Mlcom is equal to 0 (NO in step S110), it is not necessary to increase intentionally the power loss in AC motor MG so that the motor control is performed to maximize the motor drive efficiency. Thus, control device 50 determines current command values Idcom and Iqcom according to torque command value Tqcom so that the current operation point may be determined on optimum efficiency characteristic line CL0 shown in FIG. 3. For example, d- and q-axis current command values Idcom and Iqcom are determined with reference to table TBL (FIG. 4).

When motor loss increase setting value Mlcom is larger than 0 (YES in step S110), control device 50 determines in step S130 whether the output torque is being shifted or not, i.e., whether torque command value Tqcom has changed from that in the last execution of the subroutine in FIG. 6.

When torque command value Tqcom has not changed from the last value (NO in step S130), the current command value is determined in step S140 according to torque command value Tqcom so that the current operation point may be selected on the loss increase characteristic line (e.g., CL1-CL3 in FIG. 3) corresponding to motor loss increase setting value Mlcom. Thus, d- and q-axis current command values Idcom and Iqcom are determined according to the crossing points of torque command value Tqcom and motor loss increase setting value Mlcom on the table TBL shown in FIG. 4.

Conversely, when the output torque is shifting, i.e., when torque command value Tqcom has changed from the last value (YES in step S130), the current command value is determined according to the transition of the current operation point on the current phase-output torque plane shown in FIG. 5.

For example, when the current operation point shifts from the last operation point P1o (Tqcom=T1 and Mlcom=0) to operation point P2a (Tqcom=T2 and Mlcom=L1), the current command value is determined based on table TBL shown in FIG. 4 according to the change of the current operation point on the current phase-output torque plane shown in FIG. 5. Thus, d- and q-axis current command values Idcom and Iqcom corresponding to current operation point P2a are set.

As described above, the motor drive system according to the first embodiment of the invention can produce current command values Idcom and Iqcom for outputting the torque according to torque command value Tqcom while reflecting motor loss increase setting value Mlcom. Therefore, the power loss in AC motor MG can be increased according to motor loss increase setting value Mlcom while ensuring the controllability of the output torque, and thereby the surplus power of the AC motor can be consumed when necessary (e.g., when the AC motor instantaneously generates a large quantity of power due to slip/grip or the like of the wheels). Thereby, the regenerated power can be suppressed so that it is possible to prevent occurrence of an overvoltage in the motor drive system (particularly, in system voltage) due to excessive regenerative power from the AC motor.

Since a high-frequency component is not superimposed on the motor current in contrast to Patent Document 1 already described, the possibility that the operation of the motor control system becomes instable can be low. Therefore, the margin required in parts such as a capacitor can be reduced so that the manufacturing cost can be reduced. As compared with the control structure superimposing the high-frequency component on the motor current, it is possible to increase reliably the quantity of the surplus power that can be intentionally consumed in AC motor MG, i.e., the suppression quantity of the regenerative power.

As already described with reference to FIGS. 3 to 5, the current command value is produced based on the determination of the current operation points having continuity, and thereby the current command value is appropriately changed with changes in operation stage of AC motor MG (typically, changes in output torque command). Therefore, even when the torque command value changes during the consuming operation of consuming the surplus power, the follow-up control is performed on the output torque of AC motor MG while continuously executing this consuming operation. Therefore, variations in torque can be prevented.

According to the consuming operation of AC motor MG described above, since the surplus power can be consumed independently of the operation state of the motor, i.e., not only in the regenerative operation of the AC motor but also in the power running of the AC motor, this can further improve the effect of preventing the generation of the overvoltage in the motor drive system.

A correlation between the invention and the structure exemplified as the first embodiment is as follows. Inverter 20 and control device 50 in FIG. 1 correspond to the "motor drive circuit" and the "motor control means" in the invention, respectively. In FIG. 2, current command producing unit 210 corresponds to the "current command producing means" in the invention, Current control block 200 in FIG. 2 corresponds to the "current control means" in the invention, and motor loss increase setting unit 300 corresponds to the "loss increase setting means" in the invention. Table TBL in FIG. 4 corresponds to the "characteristic storing means" in the invention.

Second Embodiment

A second embodiment will be described in detail in connection with setting of the surplus power to be consumed by AC motor MG already described in the first embodiment, i.e., setting of motor loss increase setting value Mlcom indicating a quantity of power loss increase in AC motor MG. Motor loss increase setting unit 300 according to the second embodiment and a modification thereof which will be described below can be used as motor loss increase setting unit 300 in FIG. 2. Thus, the motor control to be performed after setting motor loss increase setting value Mlcom is substantially the same as that of the motor drive system according to the first embodiment, and therefore detailed description thereof is not repeated.

FIRST SETTING EXAMPLE

Figure 7:
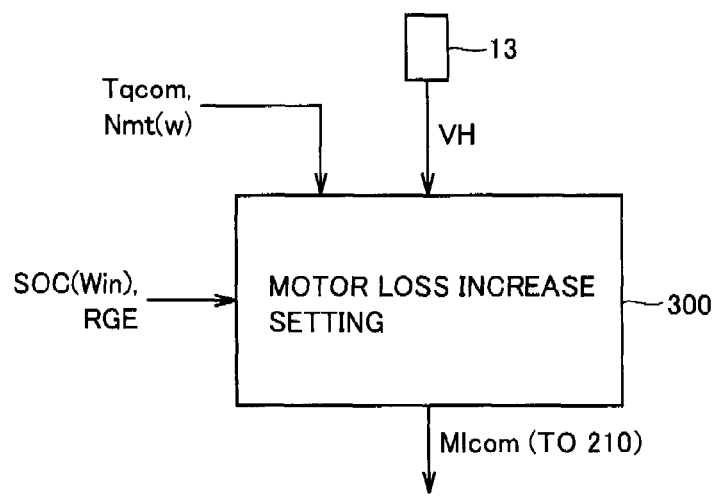
FIG. 7 illustrates information input to a motor loss increase setting unit according to a second embodiment.

Referring to FIG. 7, motor loss increase setting unit 300 receives information for determining the intentional power loss quantity in AC motor MG, and more specifically receives control signal RGE, torque command value Tqcom and motor revolution speed Nmt (angular rotation speed ω) indicating the operation state of AC motor MG.

Figure 8:
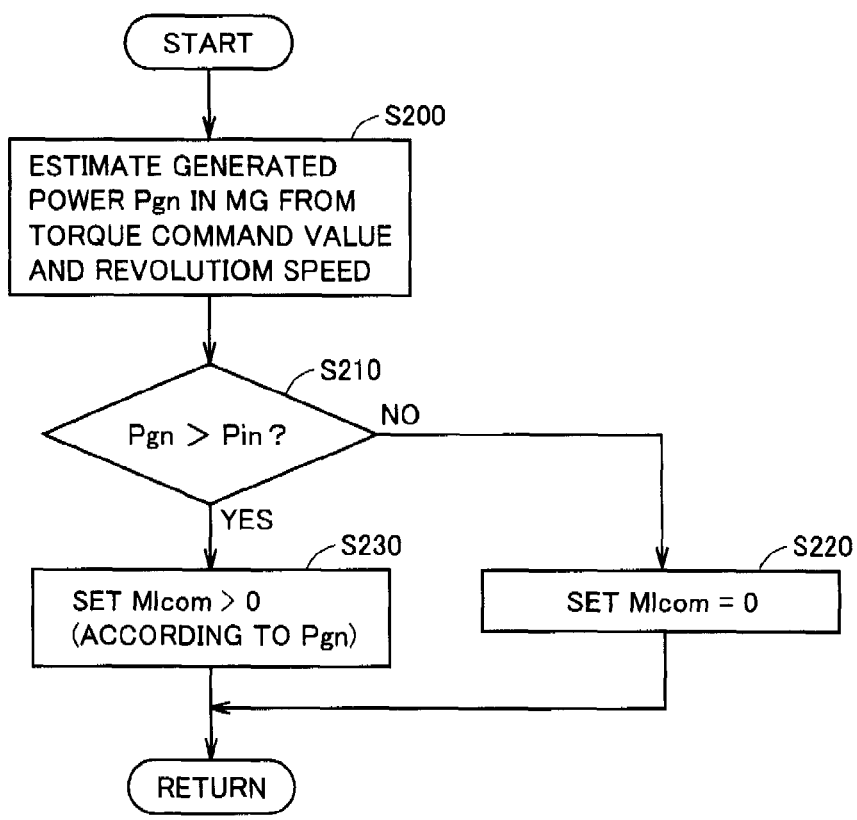
FIG. 8 is a flowchart illustrating an operation of the motor loss increase setting unit according to a first example of the second embodiment.

Motor loss increase setting unit 300 sets motor loss increase setting value Mlcom based on estimation of the generated power of AC motor MG, e.g., according to a flowchart in FIG. 8.

Referring to FIG. 8, in step S200, motor loss increase setting unit 300 estimates a generated power Pgn in AC motor MG from torque command value Tqcom and angular rotation speed ω during the regenerative operation of AC motor MG. For example, generated power Pgn can be estimated from the following equation (1):

$$Pgn = Tqcom \cdot \omega \quad (1)$$

Further, in step S210, motor loss increase setting unit 300 compares generated power Pgn and regeneratable power Pin in AC motor MG. Regeneratable power Pin may be a certain fixed value corresponding to, e.g., the power generation quantity at the time of slip/grip of the wheels, but is preferably determined based on inputtable power quantity Win of DC power supply B.

When power Pgn regenerated by AC motor MG exceeds regeneratable power Pin, i.e., the regenerative power that can be accepted on the input side of motor drive system 100, i.e., when (Pgn>Pin) is satisfied (YES in step S210), motor loss increase setting unit 300 sets motor loss increase setting value Mlcom larger than zero in step S230. In this operation, motor loss increase setting value Mlcom is set according to generated power Pgn of the AC motor and preferably to a surplus quantity (Pgn−Pin) of the regenerative power with respect to the acceptable quantity.

When generated power Pgn in AC motor MG satisfies (Pgn≦Pin), i.e., when the generated power of AC motor MG can be accepted as the regenerative power (NO in step S210), motor loss increase setting unit 300 sets motor loss increase setting value Mlcom equal to zero in step S220.

According to the flowchart of FIG. 8, as described above, generation of the excessive regenerative power of AC motor MG can be easily and reliably grasped based on the estimation of the generated power in AC motor MG according to torque command value Tqcom and angular rotation speed ω of the motor. Thus, the state in which the surplus power must be consumed by increasing the power loss in AC motor MG can be easily detected. Thereby, motor loss increase setting value Mlcom can be appropriately set, and it is possible to prevent the overvoltage generation inside the motor drive system due to the excessive regenerative power from AC motor MG.

SECOND SETTING EXAMPLE

Referring to FIG. 7 again, motor loss increase setting unit 300 further receives a detected value of system voltage VH obtained by voltage sensor 13.

Figure 9:
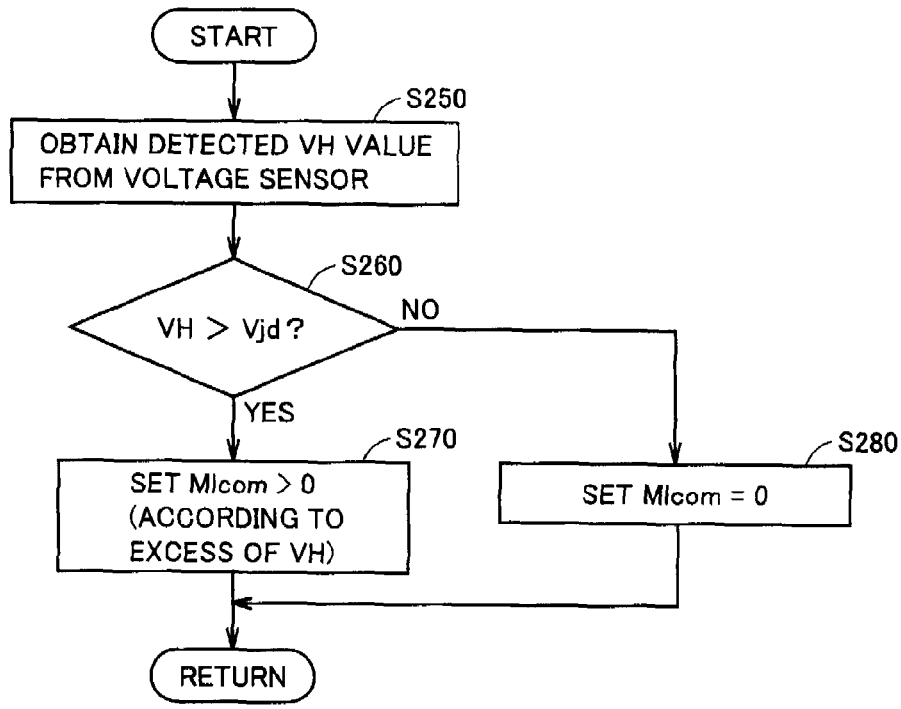
FIG. 9 is a flowchart illustrating an operation of the motor loss increase setting unit according to a second example of the second embodiment.

Motor loss increase setting unit 300 may set motor loss increase setting value Mlcom based on monitoring of system voltage VH according to a flowchart of FIG. 9.

Referring to FIG. 9, motor loss increase setting unit 300 obtains the detected value of system voltage VH (DC link voltage of the inverter) from voltage sensor 13 in step S250, and compares system voltage VH with a determination voltage Vjd to determine whether the voltage inside the system has risen or not. Determination voltage Vjd is set to a value that is lower than an overvoltage damaging a device in the motor drive system and is higher than the command value of system voltage VH.

When the system voltage rises (YES in step S260), motor loss increase setting unit 300 sets motor loss increase setting value Mlcom larger than zero (Mlcom>0) in step S270 so that the power consumption in AC motor MG may be increased for suppressing the regenerative power, and preferably for preventing the regeneration of the power from AC motor MG. In this operation, motor loss increase setting value Mlcom is preferably determined depending on a quantity of an excess of system voltage VH.

When the overvoltage has not occurred (NO in step S260), it is not necessary to increase the power loss in AC motor MG so that motor loss increase setting unit 300 sets motor loss increase setting value Mlcom to zero in step S280 for operating AC motor MG at the highest efficient point.

According to the flowchart in FIG. 9, as described above, the generation of the surplus power in AC motor MC can be reliably grasped based on the voltage rising inside the motor drive system (typically, the DC link voltage of the inverter) during the regenerative operation. Thereby, motor loss increase setting value Mlcom can be appropriately set to prevent generation of the overvoltage in the motor drive system due to the excessive regenerative power from AC motor MG.

In the flowchart of FIG. 9, it is possible to set motor loss increase setting value Mlcom larger than zero (Mlcom>0) based on the detected voltages of other portions in the motor drive system where the overvoltages may unpreferably occur.

THIRD SETTING EXAMPLE

Figure 10:
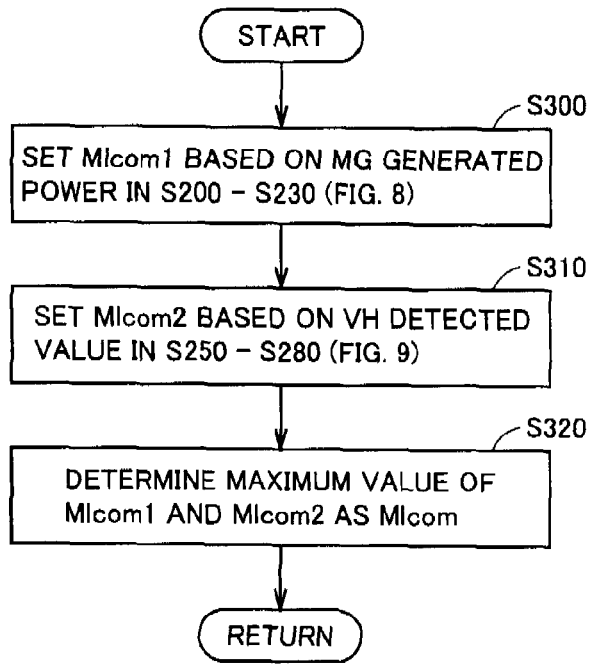
FIG. 10 is a flowchart illustrating an operation of the motor loss increase setting unit according to a third example of the second embodiment.

Further, as shown in FIG. 10, the setting manners for the motor loss increase setting values illustrated in FIGS. 8 and 9 may be combined.

Referring to FIG. 10, motor loss increase setting unit 300 sets, in step S300, a motor loss increase setting value Mlom1 for consuming an excessive regenerative power from AC motor MG based on the generated power in AC motor MG estimated through the processing in steps S200-S230 illustrated in FIG. 8.

Further, in step S310, motor loss increase setting unit 300 sets a motor loss increase setting value Mlcom2 for consuming the surplus power in AC motor MG based on the rising of the internal voltage of motor drive system 100 (typically, system voltage VH) according to the processing in steps S50-S280 in FIG. 9.

In step S320, motor loss increase setting unit 300 determines, as final motor loss increase setting value Mlcom, the maximum value selected from between values Mlcom1 and Mlcom2 set in steps S300 and S310, respectively.

According to the flowchart shown in FIG. 10, it is basically determined whether it is necessary to increase the power loss in AC motor MG or not, based on the estimation of the generated power in AC motor MG and, based on this determination, motor loss increase setting value Mlcom can be appropriately set to reduce the regenerative power from AC motor MG when the internal voltage of the motor drive system rises due to any abnormality in the generated power estimation. Thereby, it is possible to prevent reliably the regeneration of the overvoltage inside the motor drive system due to the excessive regenerative power from AC motor MG.

Modification of Second Embodiment

The increase of the power loss in AC motor MG may be determined according to not only the power balance of AC motor MG already described but also a request for the braking force in the vehicle equipped with the motor drive system.

Figure 11:
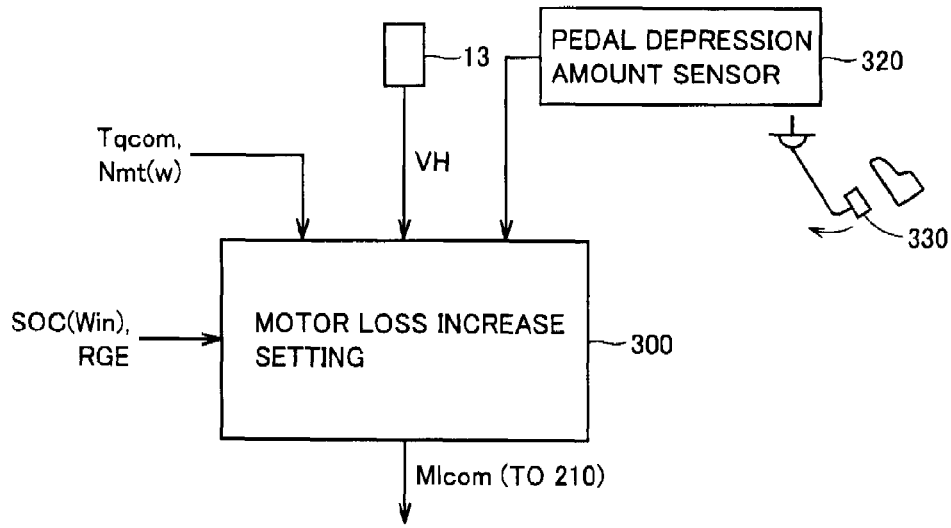
FIG. 11 illustrates information input to a motor loss increase setting unit according to a modification of the second embodiment.

Referring to FIG. 11, in the modification of the second embodiment, motor loss increase setting unit 300 receives the various information and data illustrated in FIG. 7, and additionally receives a brake pedal depression amount from a pedal depression amount sensor 320 that senses the depression amount of a brake pedal 330 that is operated for braking a vehicle by a driver.

Figure 12:
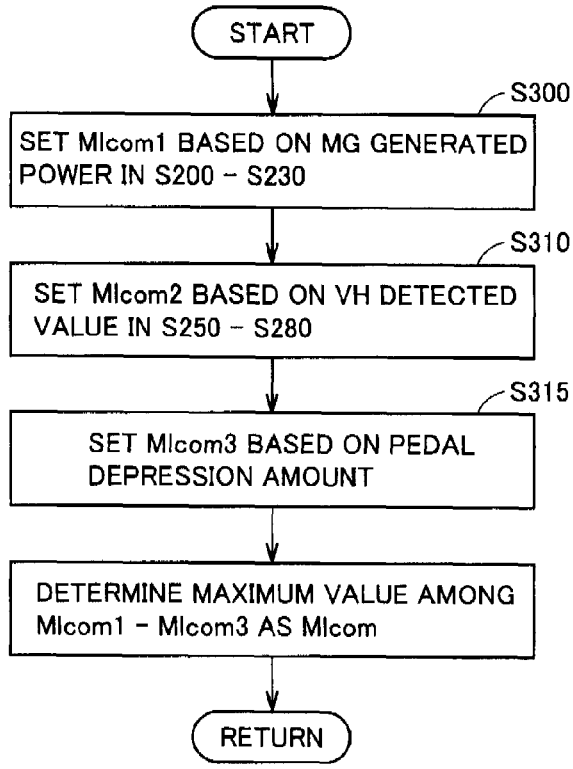
FIG. 12 is a flowchart illustrating an operation of the motor loss increase setting unit according to the modification of the second embodiment.

Motor loss increase setting unit 300 may reflect this brake pedal depression amount in motor loss increase setting value Mlcom when determining it as illustrated in FIG. 12.

Referring to FIG. 12, in the modification of the second embodiment, motor loss increase setting unit 300 executes processing in steps 300 and S310 similar to those in FIG. 10, and additionally sets a motor loss increase setting value Mlcom3 based on the brake pedal depression amount in step S315.

In step S315, motor loss increase setting value Mlcom3 is set to increase with increase in braking force requested by the driver, i.e., with increase in brake pedal depression amount. Particularly, when DC power supply B is in an overcharged state and the generation in AC motor MG (setting of (Tqcom<0)) is inhibited, Mlcom3 is set large.

When motor loss increase setting value Mlcom3 increases as described above, the drive efficiency of AC motor MG lowers, and the power loss increases, whereby an inertia moment with respect to angular rotation speed ω of AC motor MG equivalently increases. The effect of lowering angular rotation speed ω owing to increase in inertia moment can apply more strong vehicle deceleration feeling to the driver.

In step S330, motor loss increase setting unit 300 selects, as final motor loss increase setting value Mlcom, the maximum value from among motor loss increase setting value Mlcom1 obtained in step S300 based on the estimation of power generated in the AC motor, motor loss increase setting value Mlcom2 set in step S310 based on the monitoring of the system internal voltage (system voltage VH) and motor loss increase setting value Mlcom3 based on the brake depression amount.

Thereby, it is possible to prevent generation of the overvoltage in the motor drive system due to an excessive regenerative power caused by the surplus power of AC motor MG, and it is also possible to set the surplus power consumption (loss increase) in AC motor MG so that a larger vehicle deceleration feeling may be obtained when the driver requested the vehicle braking force. Thereby, it is possible to improve the braking performance or the drivability of the vehicle equipped with the motor drive system.

A correlation between the invention and the structures described as the second embodiment and the modification thereof is as follows. Voltage sensor 13 in FIG. 7 corresponds to the "voltage detector" in the invention, and step S200 in the flowchart of FIG. 8 corresponds to the "power estimating means" in the invention.

Third Embodiment

It is already known that the motor current control according to the Pulse Width Modulation (PWM) described in the first and second embodiments can increase the basic wave component amplitude of the AC voltage applied to the motor only to a value that is 0.61 times as large as that of the inverter input voltage (system voltage VH). In the hybrid vehicle or the like equipped with AC motor MG, an inducted voltage generating in AC motor MG increases in a high speed range. Therefore, it is already proposed to perform magnetic field-weakening control for improving the output in the high speed range.

From the above viewpoint, a motor drive system according to a third embodiment selectively uses three control methods illustrated in FIG. 13 for power conversion in an inverter.

Referring to FIG. 13, a sinusoidal PWM control method is used in a general PWM control and, for performing motor current feedback control according to the control block diagram of FIG. 2, the on/off of the switching element in each phase arm is controlled according to a voltage comparison between a sinusoidal voltage command value and a carrier wave (typically, a triangular wave).

Consequently, a duty ratio is controlled in connection with a set of high-level periods corresponding to the on periods of the upper arms (Q11, Q13 and Q15) and low-level period corresponding to the on period of the lower arms (Q12, Q14 and Q6) so that the basic wave components form a sinusoidal during a certain period. As is well known, the sinusoidal PWM control method can increase the basic wave component amplitude only to a value that is 0.61 times as large as that of the inverter input voltage.

Conversely, according to the rectangular wave voltage control method, the rectangular wave exhibiting a ratio of 1:1 between the high- and low-level periods is used, and a portion of this rectangular wave corresponding to one pulse is applied to AC motor MG. This can increase the modulation factor to 0.78.

In an overmodulation PWM control method, PWM control similar to the above sinusoidal PWM control method is performed by distorting the amplitude of the carrier wave to reduce it in the motor current feedback control according to the control block diagram of FIG. 2. Consequently, the basic wave components can be distorted to increase the modulation factor to a value between 0.61 and 0.78.

In AC motor MG, when the revolution speed and the output torque increase, the inducted voltage increases, and the required voltage increases. The voltage boosted by converter 12, i.e., system voltage VH must be set higher than this motor-required voltage (inducted voltage). Meanwhile, a restricted value (VH maximum voltage) is present in the voltage boosted by converter 12, i.e., in the system voltage.

Therefore, the sinusoidal PWM control method or the overmodulation PWM control method is basically executed in a region where the motor-required voltage (inducted voltage) is lower than the maximum value (VH maximum voltage), and the motor current control according to the block diagram of FIG. 2 is performed in this region to provide the output torque equal to torque command value Tqcom.

Basically, in this operation, AC motor MG is operated at the maximum efficiency and, when necessary, motor loss increase setting value Mlcom is set larger than 0 (Mlcom>0). Thereby, the motor current phase is changed to increase the power loss in AC motor MG so that generation of the excessive regenerative power in AC motor MG is prevented. These manner and operation are executed as already described in connection with the first and second embodiments and the modification thereof.

Meanwhile, when the motor-required voltage (induced voltage) reaches the maximum value (VH maximum voltage) of the system voltage, the rectangular wave voltage control method according to magnetic field-weakening control is employed while maintaining system voltage VH. In the rectangular wave voltage control method, since the amplitude of the basic wave component is fixed, the torque control is executed by the voltage phase control of the rectangular wave pulse based on the torque accomplishment value obtained by the power calculation and the torque command value.

As is illustrated in the flowchart of FIG. 14, the ECU (not shown) calculates torque command value Tqcom of AC motor MG from the vehicle-requested output based on an accelerator press-down degree or the like (step S400). In response to this, control device 50 calculates, in step S410, the motor-required voltage (induced voltage) from torque command value Tqcom and revolution speed Nmt of AC motor MG based on the table or the like that are already set.

Further, control device 50 selects, for the motor control, the rectangular wave voltage control method (magnetic field-weakening control) or the motor current control (sinusoidal PWM control method/overmodulation PWM control method) according to the relationship between the motor-required voltage and the maximum value (VH maximum voltage) of the system voltage (step S420). The selection of the sinusoidal PWM control method or the overmodulation PWM control method for the motor current control is performed according to a range of the required modulation factor. According to the above control flow, the appropriate control method is selected from among the plurality of control methods illustrated in FIG. 13 according to the operation conditions of AC motor MG.

Figure 15:
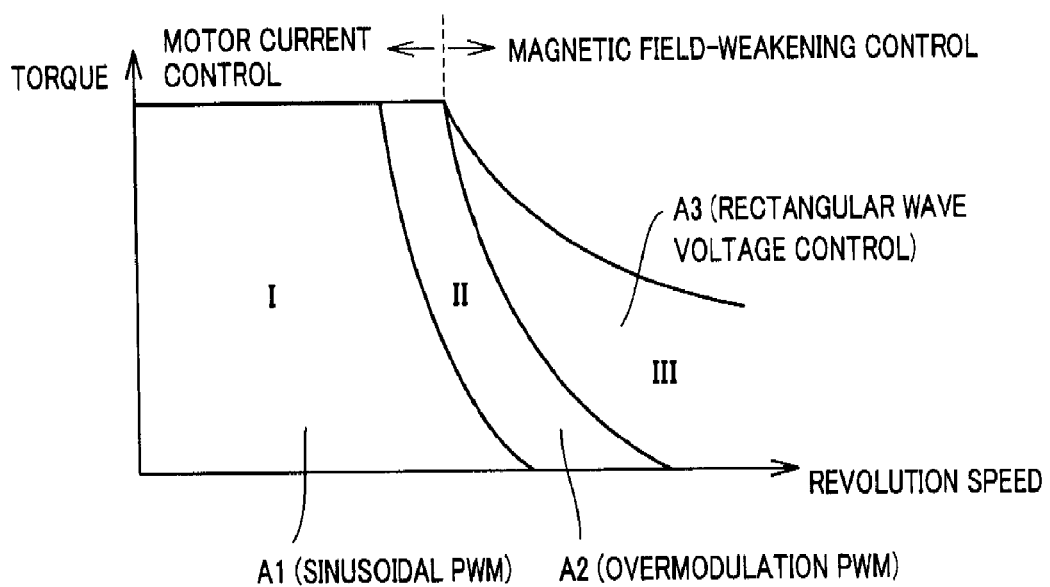
FIG. 15 illustrates switching of the control method corresponding to motor conditions in the motor drive system according to the third embodiment.

Consequently, as shown in FIG. 15, the applied control method is determined according to the operation region (revolution speed/torque) of AC motor MG. The sinusoidal PWM control method is used in a low revolution speed range A1 for reducing torque variations. The overmodulation PWM method is used in a middle revolution speed range A2, and the rectangular wave voltage control method is used in a high revolution speed range A3. In particular, employment of the overmodulation PWM control method and the rectangular wave voltage control method increases the output of AC motor MG.

In the sinusoidal PWM control method and the overmodulation PWM control method, as described above, the feedback control of the motor current is performed according to the control block diagram of FIG. 2. Conversely, in the rectangular wave voltage control method, AC motor MG is controlled according to the control block diagram of FIG. 16.

Figure 16:
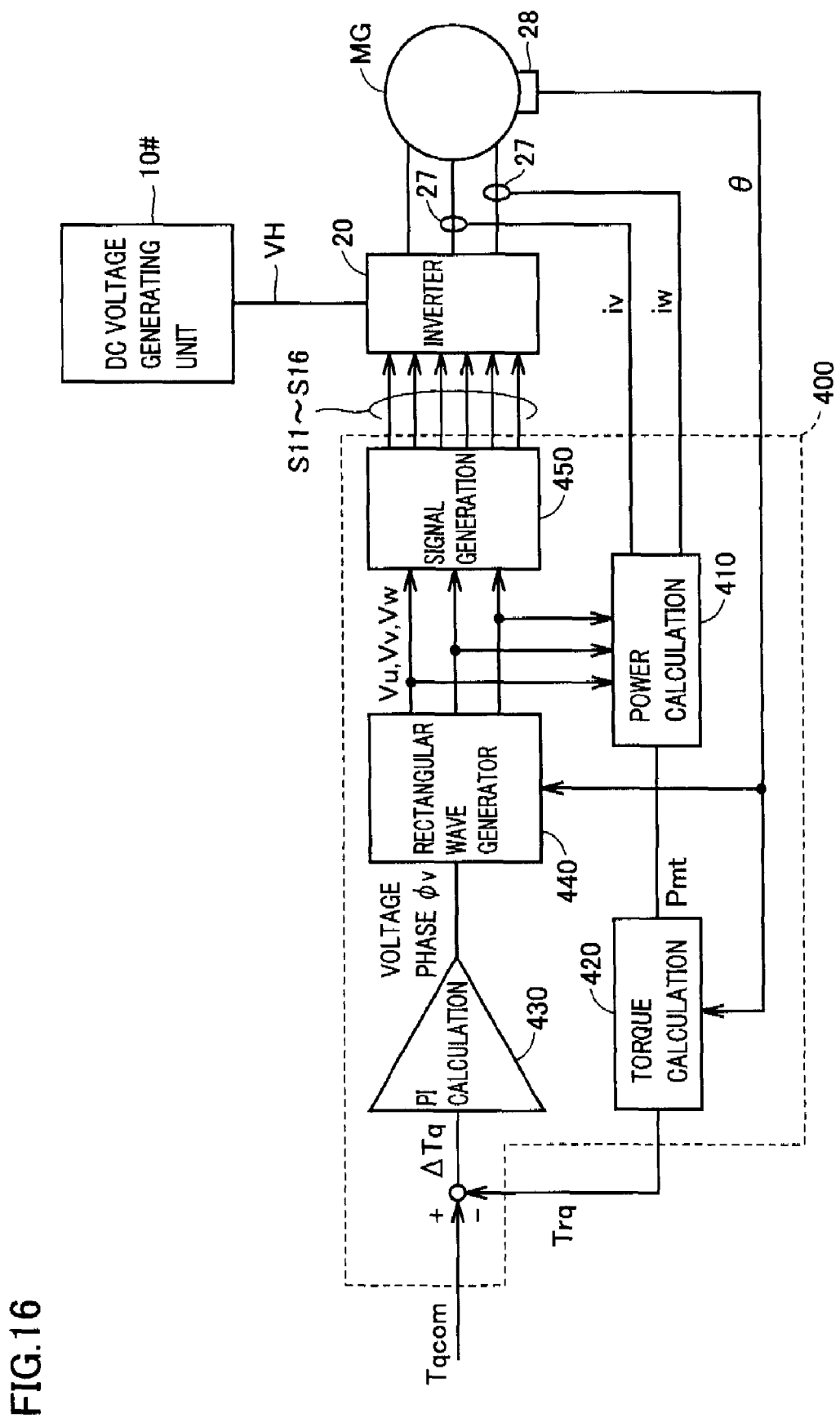
FIG. 16 is a block diagram illustrating a rectangular wave voltage control method used in the motor drive system according to the third embodiment.

Referring to FIG. 16, a rectangular wave voltage control block 400 includes a power calculating unit 410, a torque calculating unit 420, a PI calculating unit 430, a rectangular wave generator 440 and a signal generating unit 450.

Power calculating unit 410 calculates a motor supplied power Pmt according to the following equation (2) from each phase voltage iv, iw and iu (=−(iv+iw)) detected by current sensor 27 and each phase voltage Vu, Vv, Vw.

$$Pmt = iu \cdot Vu + iv \cdot Vv + iw \cdot Vw \quad (2)$$

Torque calculating unit 420 calculates a torque estimation value Trq according to the following equation (3), using motor supplied power Pmt obtained by power calculating unit 410 and angular speed ω calculated from rotational angle θ of AC motor MG detected by rotational angle sensor 28.

$$Trq = Pmt/\omega \quad (3)$$

PI calculating unit 430 receives torque deviation ΔTrq with respect to torque command value Trqcom (ΔTrq=Trqcom−Trq). PI calculating unit 430 performs PI calculation with a prescribed gain on torque deviation ΔTrq to obtain a control deviation, and sets phase φv of the rectangular wave voltage depending on the obtained control deviation.

Figure 17:
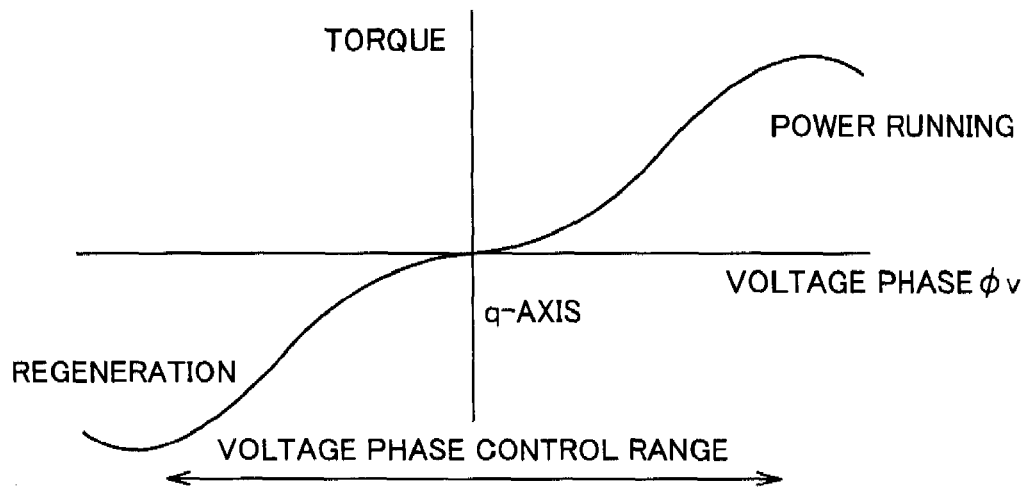
FIG. 17 illustrates output torque control in the rectangular wave voltage control method.

Specifically, voltage phase φv is determined depending on torque command value Tqcom according to the change characteristics of voltage phase φv and output torque shown in FIG. 17. Thus, when a positive torque is generated (Tqcom>0), the voltage phase is advanced at the time of insufficient torque, and the voltage phase is delayed at the time of excessive torque. In addition, when a negative torque is generated (Tqcom<0), the voltage phase is delayed at the time of insufficient torque, and the voltage phase is advanced at the time of excessive torque.

Rectangular wave generator 440 generates each phase voltage command value (rectangular wave pulse) Vu, Vv or Vw according to voltage phase φv set by PI calculating unit 430. Signal generating unit 450 generates switching control signals S11-S16 according to each phase voltage command value Vu, Vv or Vw. Inverter 20 performs a switching operation according to switching control signals S11-S16 so that a rectangular wave pulse according to voltage phase φv is applied as each phase voltage of the motor.

As described above, in the rectangular wave voltage control method, the torque control of AC motor MG can be performed by the torque (power) feedback control. However, in the rectangular wave control method, the motor-applied voltage is operated by changing only the phase, and therefore the control response is degraded as compared with the PWM control method in which both the amplitude and the phase of the motor-applied voltage can be operated.

Figure 18:
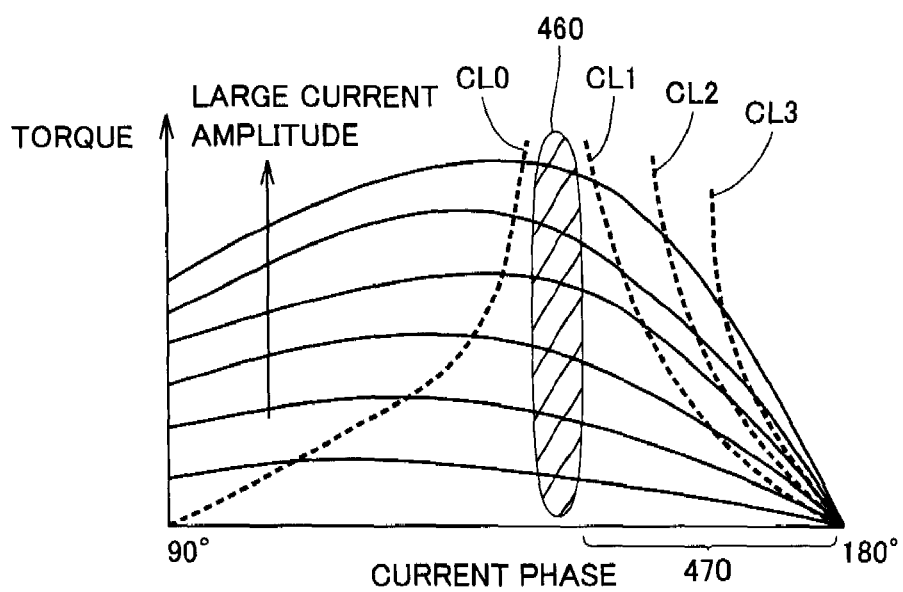
FIG. 18 is a conceptual diagram illustrating current operation points in the rectangular wave voltage control method.

FIG. 18 is a conceptual diagram that can be compared with FIG. 3, and illustrates current operation points in the rectangular wave voltage control method.

Referring to FIG. 18, in the rectangular wave voltage control method, the current phase takes an unadjustable fixed value, and the current operation points are located within a region 460. Thus, in the rectangular wave voltage control method, it is impossible to perform the power loss control which can arbitrarily change the power loss in AC motor MG as already described in connection with the first and second embodiments and its modification.

Therefore, the third embodiment will be described in the power loss control for AC motor MG in the operation region that normally corresponds to the rectangular wave voltage control method in the motor control method based on the premise that the switching between the motor current control and the rectangular wave voltage control is performed according to the operation region.

Figure 19:
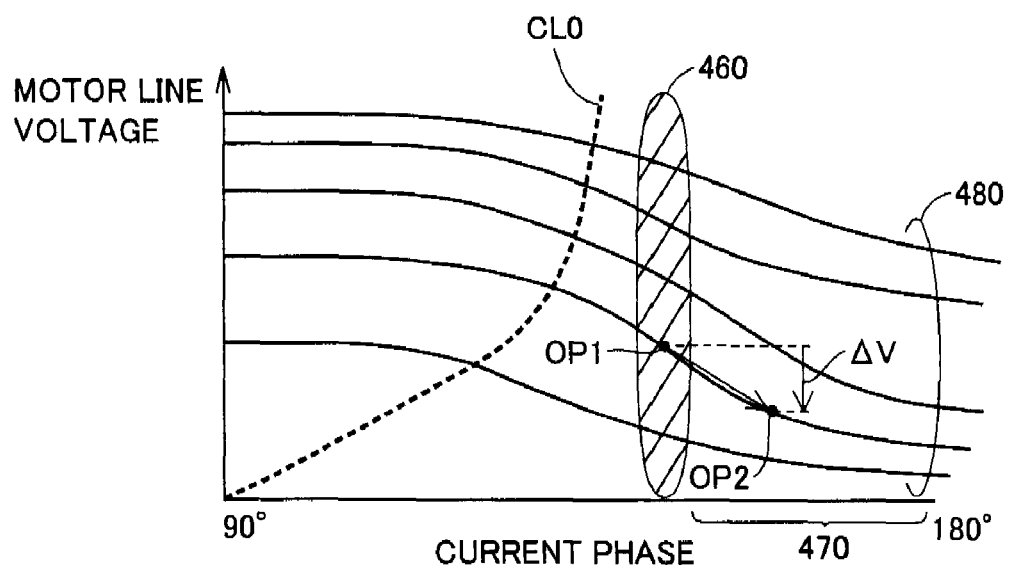
FIG. 19 is a conceptual diagram illustrating a manner of applying motor current control in a driving region to which the rectangular wave voltage control method is to be applied.

FIG. 19 shows a set of characteristic lines 480 representing the change characteristics of a motor line voltage appearing across motor lines in AC motor MG with respect to the current phase. As can be understood from FIG. 19, when the generated torque is constant, the motor line voltage can be lowered by setting the current operation point on the advanced side. Particularly, the current operation point may be set in a region 470 that is located on the advanced side of the current phase with respect to region 460 of the current operation point in the rectangular wave voltage control method, and thereby the motor line voltage can be lowered.

For example, when the generated torque is constant, the current operation point may be shifted from a current operation point OP1 in the rectangular wave voltage control method to an advanced current operation point OP2, and thereby the motor line voltage can be lower by ΔV. This represents the followings. When the motor current control (FIG. 2) is performed according to the PWM control method to locate the current operation point in region 470, the motor drive efficiency can be further lowered while ensuring the torque controllability, and the power loss in AC motor MG can be increased to suppress the regenerative power.

Figure 20:
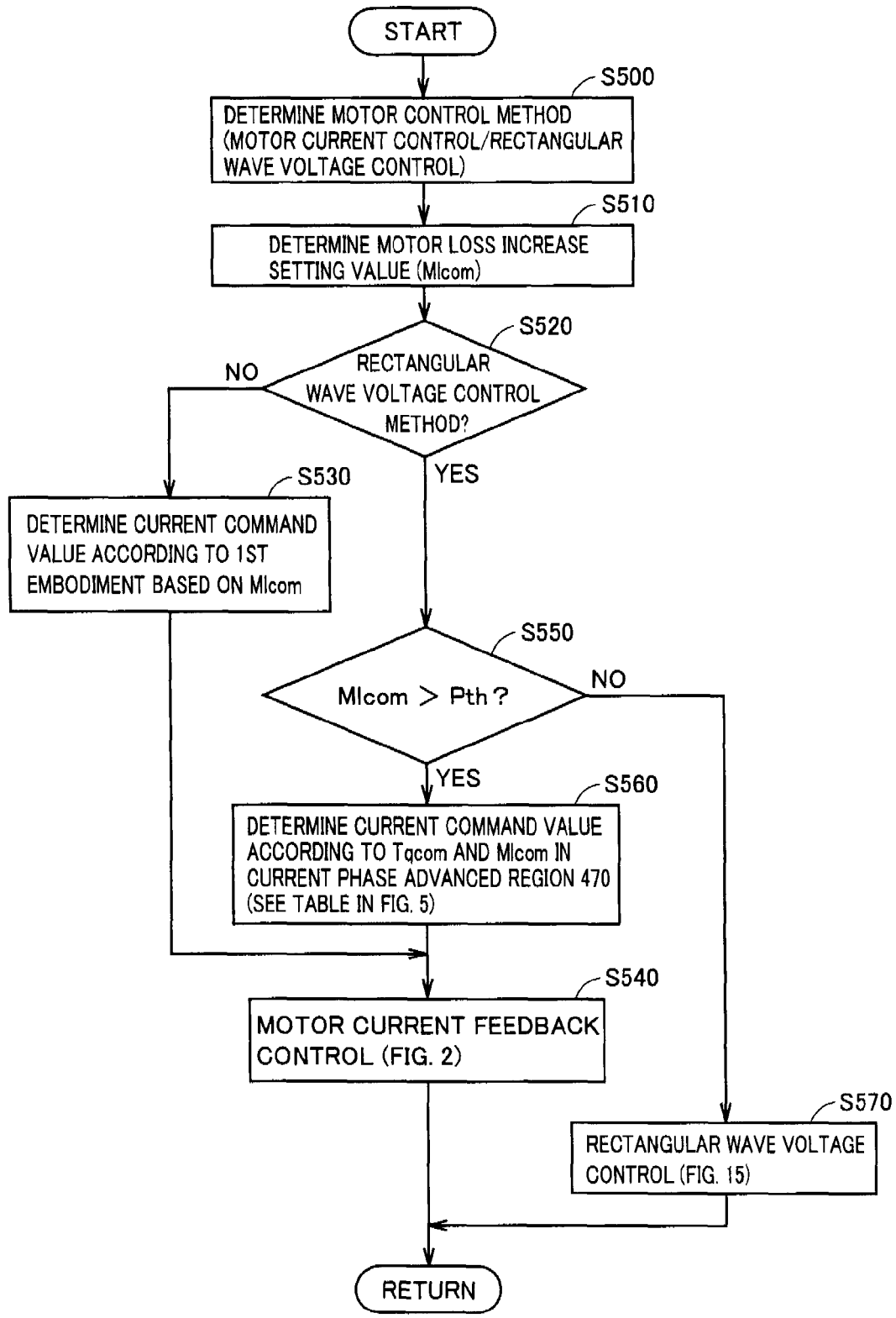
FIG. 20 is a flowchart illustrating a motor control method in a motor drive control system according to the third embodiment.

FIG. 20 is a flowchart illustrating the motor control method in the motor drive control system according to the third embodiment.

Referring to FIG. 20, control device 50 selects the motor current control or the rectangular wave voltage control for the motor control mode as illustrated in FIGS. 13 to 15 in step S500. Further, control device 50 determines motor loss increase setting value Mlcom according to the first and second embodiments and its modification in step S510.

In step S520, control device 50 determines whether the rectangular wave voltage control method is selected in step S500 or not. When the rectangular wave voltage control method is not selected, i.e., when the motor current control is selected (NO in step S520), the current command values are determined according to the first embodiment based on torque command value Tqcom and motor loss increase setting value Mlcom in step S530. Further, control device 50 executes the motor current feedback control shown in FIG. 2 according to the current command values (Idcom and Iqcom) determined in step S540.

When the rectangular wave voltage control method is selected (YES in step S520), control device 50 determines whether motor loss increase setting value Mlcom has exceeded a determination value Pth or not (step S550). For example, determination value Pth is set corresponding to the power loss in the rectangular wave voltage control method.

When value Mlcom is equal to or lower than value Pth (NO in step S550), it is not necessary to increase intentionally the motor power loss in AC motor MG so that control device 50 performs the rectangular wave voltage control method according to the control block diagram of FIG. 15 in step S570, and thereby controls AC motor MG to generate the output torque according to torque command value Tqcom.

Conversely, when Mlcom is larger than Pth (YES in step S550), i.e., when the power loss that is to be generated in AC motor MG when viewed from the power balance in the motor drive system has exceeded the power loss caused in the rectangular wave voltage control method, control device 50 determines the current command value in step S560 for executing the motor current feedback control instead of the rectangular wave voltage control.

In step S560, control device 50 determines the current command value corresponding to motor loss increase setting value Mlcom in current phase advanced region 470 shown in FIG. 19. For example, the current operation points are set on the loss increase characteristic lines similar to lines CL1-CL3 in FIG. 3. By preparing a table similar to table TBL (FIG. 4), d- and q-axis current command values Idcom and Iqcom can be determined for the above current command value according to motor torque command value Tqcom and motor loss increase setting value Mlcom.

In step S540, control device 50 executes the motor current feedback control shown in FIG. 2 according to the current command values (Idcom and Iqcom) determined in step S560 instead of the rectangular wave voltage control selected in step S500.

In the motor drive system according to the third embodiment, as described above, the motor current control for basically operating the AC motor at the optimum efficiency and the rectangular wave voltage control for ensuring the motor output in the high-speed range can be selectively employed, and thereby the operable region of AC motor MG can be enlarged. Further, when the power loss is to be increased in the operation of the rectangular wave voltage control method, the motor current control in the region where the current phase is further advanced as compared with the rectangular wave voltage control method can be employed instead of the rectangular wave voltage control. Therefore, at any portion in the enlarged operation region, the surplus power can be consumed by intentionally increasing the power loss in AC motor MG. Consequently, it is possible to ensure the output in a high speed range by employing the rectangular wave voltage control method and to prevent the generation of the overvoltage in the motor drive system that may occur due to excessive increase in regenerative power from AC motor MG.

A correlation between the invention and the structure example described as the third embodiment is as follows. Rectangular wave voltage control block 400 in FIG. 16 corresponds to the "rectangular wave voltage control means" in the invention. In the flowchart of FIG. 20, step S500 corresponds to the "control mode selecting means", and steps S540-S560 correspond to the "control mode correcting means" in this invention.

Fourth Embodiment

A fourth embodiment will now be described in connection with the control structure in the motor drive system provided with a plurality of AC motors that are connected for bidirectional power supply and reception to/from a common power supply, and particularly the control structure for preventing an overvoltage due to generation of the excessive regenerative power from the AC motor.

Figure 21:
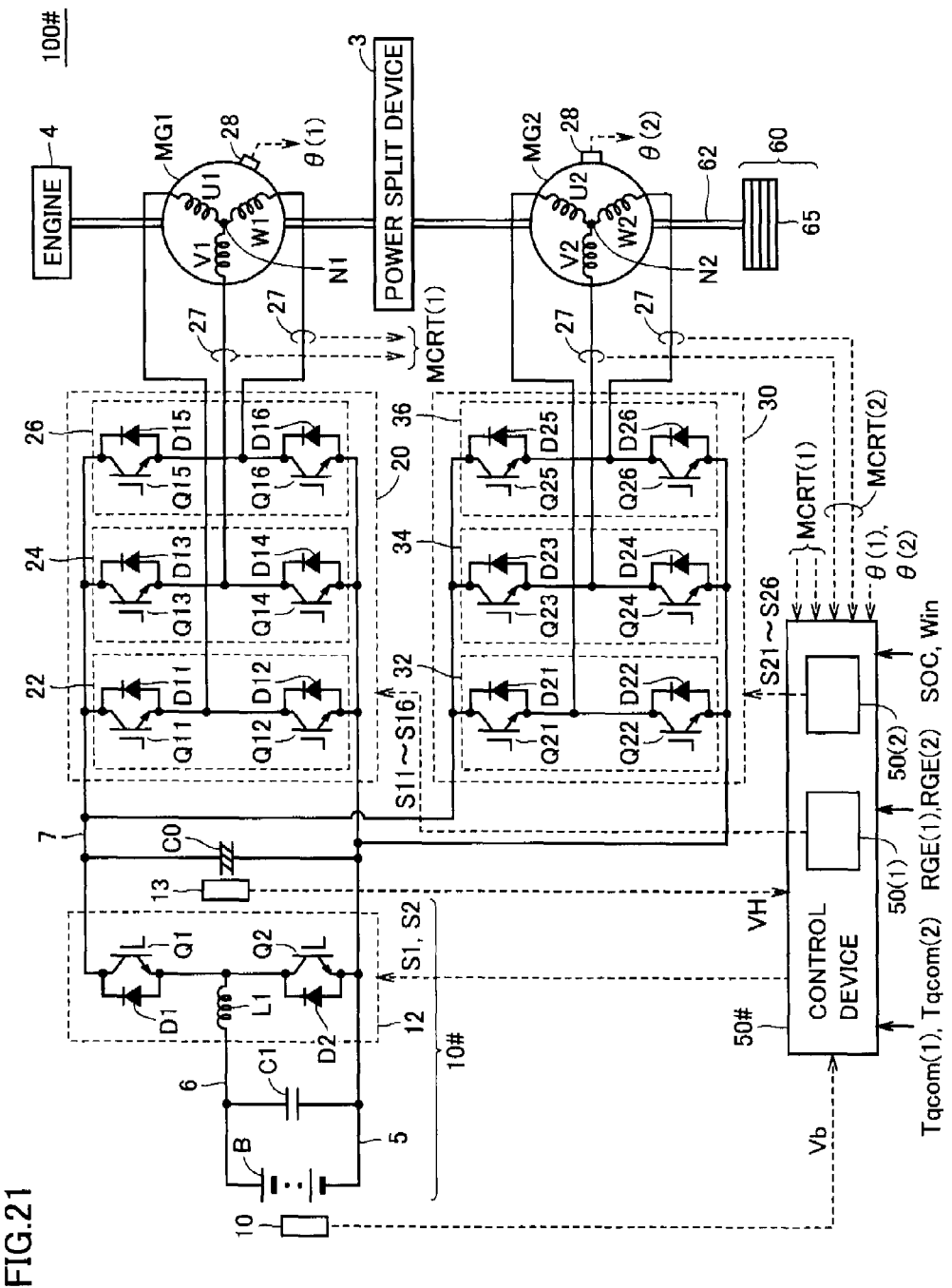
FIG. 21 is a diagram showing a whole structure of a motor drive system according to a fourth embodiment of the invention.

FIG. 21 is a block diagram illustrating a structure of a hybrid car 100# equipped with the motor drive system according to the fourth embodiment.

Referring to FIG. 21, hybrid car 100# equipped with the motor drive system according to the fourth embodiment includes a power split device 3, engine 4, motor generators MG1 and MG2 (AC motors), drive shaft 62, and drive wheel 65. Drive shaft 62 and drive wheel 65 form load 60 of the motor drive system.

Hybrid car 100 further includes DC voltage generating unit 10#, smoothing capacitor C0, inverters 20 and 30, and a control device 50#.

DC voltage generating unit 10# has substantially the same structure as that in FIG. 1, and is connected to ground line 5 and power supply line 7.

Motor generator MG1 has substantially the same structure as AC motor MG in FIG. 1, and includes U-, V- and W-phase coil windings U1, V1 and W1 arranged on a stator as well as a rotor (not shown). Ends on one side of U-, V- and W-phase coil windings U1, V1 and W1 are connected together at a neutral point N1, and the other ends thereof are connected to U-, V- and W-phase arms 22, 24 and 26 of inverter 20, respectively. Switching elements Q11-Q16 perform the switching operation in response to switching control signals S11-S16 provided from control device 50#, and thereby inverter 20 performs bidirectional power conversion between DC voltage generating unit 10# and motor generator MG1.

Inverter 30 has substantially the same structure as inverter 20, and includes switching elements Q21-Q26 controlled to be turned on/off by switching control signals S21-S26 as well as antiparallel D21-D26.

Motor generator MG2 has substantially the same structure as motor generator MG1, and includes U-, V- and W-phase coil windings U2, V2 and W2 arranged on a stator as well as a rotor (not shown). Similarly to motor generator MG1, ends on one side of U-, V- and W-phase coil windings U2, V2 and W2 are connected together at a neutral point N2, and the other ends thereof are connected to U-, V- and W-phase arms 32, 34 and 36 of inverter 30, respectively.

Switching elements Q21-Q26 perform the switching operation in response to switching control signals S21-S26 provided from control device 50#, and thereby inverter 30 performs bidirectional power conversion between DC voltage generating unit 10# and motor generator MG2.

Power split device 3 is coupled to engine 4 and motor generators MG1 and MG2 for distributing the power between them. For example, power split device 3 may be formed of a planetary gear mechanism having three rotation axes of a sun gear, a planetary gear and a ring gear. These three rotation axes are connected to rotation axes of engine 4 and motor generators MG1 and MG2, respectively. For example, the rotor of motor generator MG1 has a hollow structure, through which the crank shaft of engine 4 coaxially extends so that engine 4 and motor generators MG1 and MG2 can be mechanically connected to power slit device 3.

The rotation shaft of motor generator MG2 is coupled to drive shaft 62 via a reduction gear and an operation gear (both not shown). Reduction gears for the rotation shaft of motor generator MG2 may be incorporated into power split device 3.

Motor generator MG1 is incorporated into hybrid car 100# for operation as an electric generator driven by engine 4 and as an electric motor for starting engine 4. Motor generator MG2 is incorporated into hybrid car 100# as the motor for driving drive wheel 65.

Each of motor generators MG1 and MG2 is provided with current sensor 27 and rotation angle sensor (resolver) 28 similarly to AC motor MG in FIG. 1. These sensors detect motor current MCRT(1) and rotor rotation angle θ(1) of motor generator MG1 as well as motor current MCRT(2) and rotor rotation angle θ(2) of motor generator MG2, and provide them to control device 50#.

Similarly to control device 50, control device 50# receives a value of DC voltage Vb of DC power supply B detected by voltage sensor 10 and a value of system voltage VH detected by voltage sensor 13 as well as information relating to DC power supply B such as the SOC (State of Charge) and inputtable power quantity Win indicating the charging restriction.

Further, control device 50# receives a torque command value Tqcom(1) of motor generator MG1 and a control signal RGE(1) indicating the regenerative operation thereof as well as a torque command value Tqcom(2) of motor generator MG2 and a control signal RGE(2) indicating the regenerative operation thereof.

Control device 50# includes a control device 50(1) for controlling motor generator MG1 and a control device 50(2) for controlling motor generator MG2. Control device 50(1) has substantially the same control structure as control device 50 shown in FIG. 1, and thereby produces switching control signals S11-S16 for inverter 20 so that motor generator MG1 may operate according to the command values. Likewise, control device 50(2) has substantially the same control structure as control device 50, and thereby produces switching control signals S21-S26 for inverter 30 so that motor generator MG2 may operate according to the command values.

The motor drive system shown in FIG. 21 is configured such that the regenerative powers from the plurality of motor generators MG1 and MG2 can be supplied to common DC power supply B. Therefore, for intentionally increasing the power losses in respective motor generators MG1 and MG2 similarly to the first to third embodiments, it is necessary to determine the surplus powers (i.e., the motor loss increase setting values) to be consumed by the respective motor generators while monitoring the power balance of whole motor generators MG1 and MG2.

Figure 22:
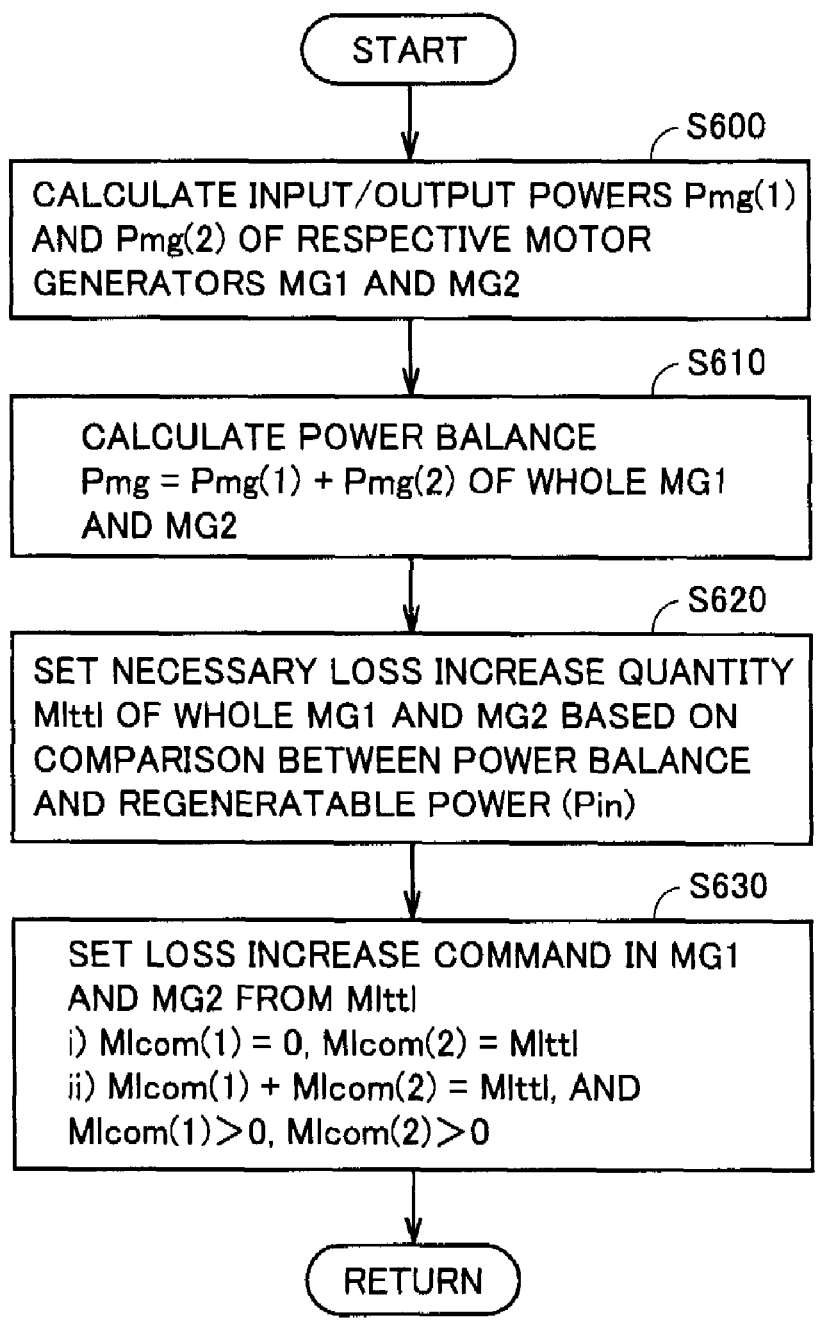
FIG. 22 is a flowchart illustrating a manner of determining a motor loss increase setting value in each motor generator in the motor drive system according to the fourth embodiment.

FIG. 22 is a flowchart illustrating a method of determining the motor loss increase setting value in each of motor generators MG1 and MG2 in the motor drive system according to the fourth embodiment.

Referring to FIG. 22, control device 50# estimates input/output powers Pmg(1) and Pmg(2) in respective motor generators (AC motors) MG1 and MG2 according to equation (1) in step S600. Each of input/output powers Pmg(1) and Pmg(2) takes a positive value when corresponding motor generator performs the regenerative operation (power generation), and takes a negative value during the power running.

In step S610, control device 50# obtains a sum of input/output powers Pmg(1) and Pmg(2) obtained in step S600, and thereby calculates a whole power balance Pmg (=Pmg(1)+Pmg(2)) of motor generators MG1 and MG2. Thereby, even when one of the motor generators (AC motors) is performing the power running to reduce the power, it is possible to monitor whether the whole system is producing the surplus power when the other motor generator (AC motor) is generating the power.

In step S620, control device 50# sets a necessary loss increase quantity Mlttl corresponding to the surplus power of the whole motor generators MG1 and MG2 based on a comparison between power balance Pmg of the whole motor generators MG1 and MG2 and quantity Pin (Pin≧0) of the regeneratable power to the input side of motor drive system 100#.

More specifically, in step S620, necessary loss increase quantity Mlttl is set to zero (Mlttl=0) in the case of (Pmg≦Pin), and is set to exceed zero (Mlttl>0) in the case of (Pmg>Pin). In this processing, it is preferable to set necessary loss increase quantity Mlttl according to whole power balance Pmg or a surplus quantity (Pmg−Pin) of whole power balance Pmg with respect to regeneratable power Pin.

In step S620, necessary loss increase quantity Mlttl of the whole motor may be determined by further reflecting the detection of system voltage VH by voltage sensor 13, similarly to the second embodiment. Alternatively, necessary loss increase quantity Mlttl may be increased according to the vehicle braking force required by the driver, similarly to the modification of the second embodiment.

In step S630, control device 50# sets the surplus powers to be consumed by respective motor generators MG1 and MG2 in necessary loss increase quantity Mlttl, and thus sets the loss increase commands for the respective motor generators so that whole motor generators MG1 and MG2 may consume the surplus power of whole motor generators MG1 and MG2 obtained in step S620.

In a first manner, the motor loss increase command can be distributed between motor generators MG1 and MG2 according to the following equation (4) so that the motor loss may increase on a priority basis in motor generator MG2 that is connected to drive shaft 62 for directly outputting the torque.

$$Mlcom(1)=0, \text{ and } Mlcom(2)=Mlttl \quad (4)$$

In particular, when necessary loss increase quantity Mlttl is increased in response to the vehicle braking force request by the driver, motor generator MG2 increases the motor loss on a priority basis so that the deceleration feeling of the vehicle can be enhanced, similarly to the modification of the second embodiment.

As a second manner, necessary loss increase quantity Mlttl in the whole motor may be determined to distribute it between motor generators MG1 and MG2 according to the equation (5).

$$Mlcom(1)+Mlcom(2)=Mlttl, Mlcom(1)>0, \text{ and } Mlcom(2)>0 \quad (5)$$

In particular, according to this second manner, it is possible to reduce the surplus power consumed per motor generator (AC motor), and therefore it is possible to expect the reduction in transition time required for changing the operation state from the optimum efficiency to the loss increase, and to expect the suppression of the torque variations. Further, it is possible to suppress the heating value per motor generator so that the power balance of the whole motor drive system can be improved more smoothly. Further, the suppression quantity of the regenerative power can be reliably increased, as compared with the case where the power loss is increased for concentratedly consuming the surplus power in the single motor generator (AC motor).

After motor loss increase setting values Mlcom(1) and Mlcom(2) of respective motor generators MG1 and MG2 are determined in step S630, control device 50(1) controls motor generator MG1 based on torque command value Tqcom(1) and motor loss increase setting value Mlcom(1). Likewise, control device 50(2) controls motor generator MG2 based on torque command value Tqcom(2) and motor loss increase setting value Mlcom(2). The control operations of control devices 50(1) and 50(2) based on the torque command values and the motor loss increase setting values are substantially the same as those already described in connection with the first or third embodiment, and therefore description thereof is not repeated.

In this embodiment, since each motor generator can consume the surplus power regardless of the motor operation state (i.e., the regenerative operation and the power running), the motor generators can consume the surplus power of the whole motor drive system in a well-balanced fashion. Thus, the distribution of the surplus power according to the above second manner can be executed smoothly.

A correlation between the invention and the structure exemplified as the fourth embodiment is as follows. In FIG. 21, motor generators MG1 and MG2 correspond to "the plurality of AC motors" in the invention, each of inverters 20 and 30 corresponds to the "motor drive circuit" in the invention, and each control device 50(1) or 50(2) corresponds to the "motor control means" in the invention. Steps S620 and S630 in FIG. 22 correspond to the "distributing means" in the invention.

Fifth Embodiment

A fifth embodiment will be described in connection with a preferable manner of distributing the consumption surplus power between the plurality of AC motors that are employed in the motor drive system and are described in connection with the fourth embodiment.

The fifth embodiment will now be described in connection with the preferable distribution of the consumption surplus power between motor generators MG1 and MG2 in the motor drive system shown in FIG. 21. A distribution method of distributing the consumption surplus power between motor generators MG1 and MG2 as described below is executed by control device 50# as a subroutine that corresponds to the processing in step S630 in the manner of determining the motor loss increase setting value in each motor generator shown in FIG. 22.

(Distribution Based on Consumable Surplus Power)

Figure 23:
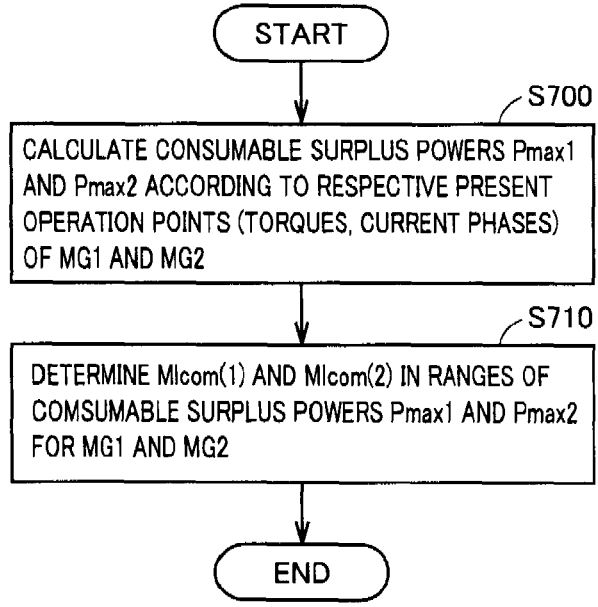
FIG. 23 is a flowchart illustrating a first example of consumption surplus power distribution between motor generators according to a fifth embodiment.

Referring first to FIG. 23, description will now be given on a manner (first example) of determining the motor loss increase setting value within a range of the consumable surplus power for each motor generator.

Referring to FIG. 23, control device 50# calculates consumable surplus power Pmax1 or Pmax2, which is the maximum value of the present consumable surplus power for respective motor generators MG1 and MG2 based on the present operation state, and specifically based on the current operation point (the torque and the current phase) in step S700.

A manner of calculating consumable surplus powers Pmax1 and Pmax2 will now be described with reference to FIG. 24.

Figure 24:
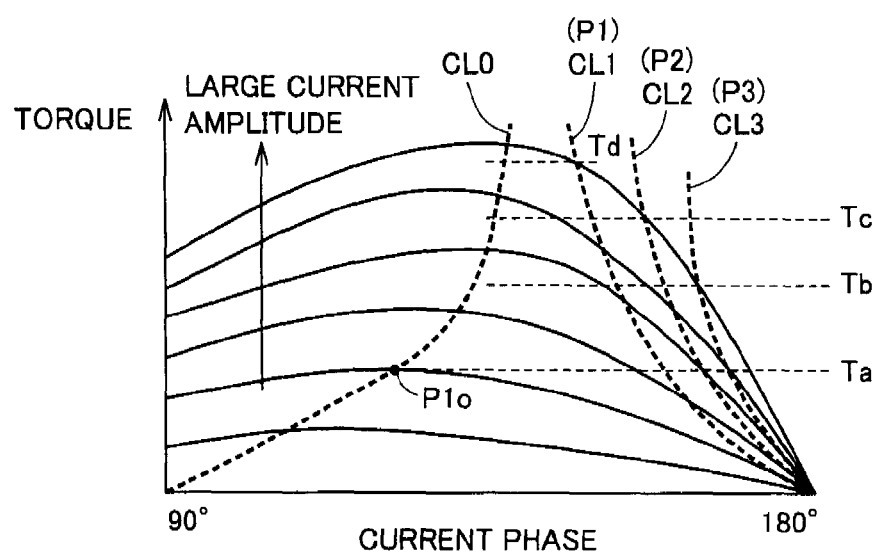
FIG. 24 is a conceptual diagram illustrating a manner of calculating a consumable surplus power in each motor generator.

FIG. 24 illustrates current phase-torque characteristics similarly to FIG. 3. According to the embodiment of the invention, each motor generator MG (which generally represents motor generators MG1 and MG2 hereinafter) consumes the surplus power by changing the current operation point to lower the motor drive efficiency according to the current phase-output characteristics.

In FIG. 24, it is assumed that P1, P2 and P3 (P1<P2<P3) represent the consumable surplus powers at the current operation points on loss characteristic lines CL1, CL2 and CL3, respectively. When the output torque is equal to Ta, the consumable surplus power exceeds P3 according to the changes in current phase. When the output torque is equal to Tb (Tb>Ta), the maximum value of the consumable surplus power is equal to P3 according to the changes in current phase. Likewise, when the output torque is equal to Tc (Tc>Tb), the maximum value of the consumable surplus power is equal to P2 according to the changes in current phase. When the output torque is equal to Td (Td>Tc), the maximum value of the consumable surplus power is equal to P1 according to the changes in current phase.

As described above, the present consumable surplus power changes according to the operation state of each motor generator MG, and specifically the consumable surplus power decreases with relative increase in output torque. Therefore, according to the characteristic lines illustrated in FIG. 24, it is possible to prepare in advance a table in which consumable surplus power Pmax (which generally represents Pmax1 and/or Pmax2, hereinafter) at each current operation point is set for each motor generator MG.

For example, it is possible to prepare the table in which the respective sections are similar to those in the table of current command values Idcom and Iqcom illustrated in FIG. 4 and the table value represents consumable surplus power Pmax. According to the processing in step S700, consumable surplus powers Pmax1 and Pmax2 can be calculated by referring to the table based on the present current operation point for each of motor generators MG1 and MG2.

Referring to FIG. 23, in step S710, control device 50# determines loss increase commands Mlcom(1) and Mlcom(2) in motor generators MG1 and MG2 within ranges of consumable surplus powers Pmax1 and Pmax2 obtained in step S700, respectively. Thus, the loss increase commands for motor generators MG1 and MG2 are determined according to the following equation (6):

$$\text{Mlcom}(1) \leq \text{Pmax1}, \text{ and Mlcom}(2) \leq \text{Pmax2} \qquad (6)$$

By employing this control structure, the surplus powers in consumable ranges can be distributed to the respective motor generators so that the plurality of motor generators can consume the surplus power to keep a balance between the plurality of motor generators according to the operation state (in both the regenerative operation and the power running) of each motor generator.

In hybrid car 100# shown in FIG. 21, the output of motor generator MG2 provides the drive power of drive wheel 65, but the output of motor generator MG operating as the power generator is not directly used for driving drive wheel 65. Therefore, the output variations of motor generator MG2 forming the "drive motor" directly affect the drivability of the vehicle, but the output variations of motor generator MG1 do not directly affect the drivability of the vehicle. In view of this difference in function between motor generators MG1 and MG2, the operation of consuming the surplus power that changes the motor current is preferably executed by using, as far as possible, motor generator MG1 (i.e., the motor not for driving the wheel). Thus, the distribution manner in which the whole surplus power is consumed by motor generator MG1 on a priority basis can suppress the possibility that the operation of consuming the surplus power according to the embodiment of the invention affects the vehicle driving.

Figure 25:
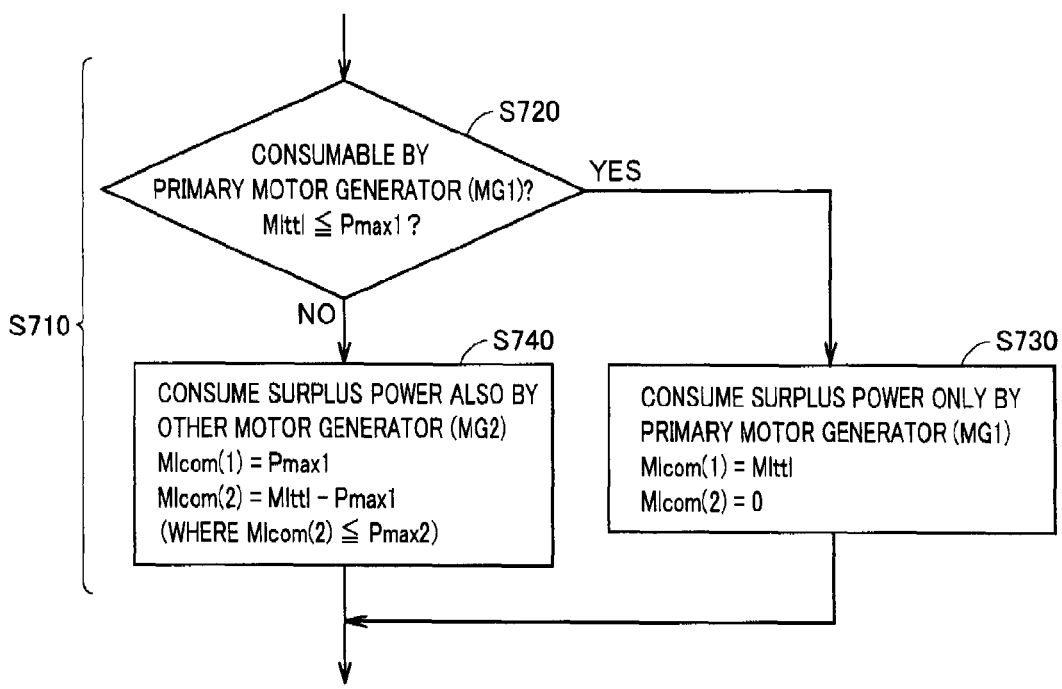
FIG. 25 is a flowchart illustrating a preferable control structure for the consumption surplus power distribution illustrated in FIG. 23.

Therefore, the setting of the loss increase processing of the respective motor generators in step S710 may include the priorities that are assigned to the motor generators for consuming the surplus power as illustrated in FIG. 25.

Referring to FIG. 25, the processing in step S710 illustrated in FIG. 23 is preferably formed of steps S720-S740.

In step S720, control device 50# compares output loss increase quantity Mlttl corresponding to the surplus power of whole motor generators MG1 and MG2 with consumable power Pmax1 obtained in step S700 (FIG. 23), i.e., consumable power Pmax1 of motor generator MG1 to be operated primarily to consume the surplus power.

When (Mlttl≦Pmax1) is satisfied (YES in step S720), motor generator MG1 can consume whole surplus power Mlttl so that control device 50# distributes the consumption surplus power according to the following formula (7) to consume the surplus power only by AC motor MG1.

$$Mlcom(1)=Mlttl, \text{ and } Mlcom(2)=0 \quad (7)$$

Conversely, when (Mlttl>Pmax1) is satisfied (NO in step S720), motor generator MG1 to be operated primarily to consume the surplus power cannot consume the whole surplus power so that the other motor generator MG2 must be additionally used for consuming the surplus power. Therefore, control device 50# distributes the consumption surplus power according to the following equation (8) in step S740.

$$Mlcom(1)=Pmax1, \text{ and } Mlcom(2)=Mlttl-Pmax1 \quad (8)$$

(where Mlcom(2)≦Pmax×2)

Owing to the control structure shown in FIG. 25, when the system is employed in the hybrid car, it can suppress the possibility that the surplus power consuming operation in the motor generators affects the vehicle drivability.

(Distribution Based on Motor Temperature Monitoring)

As described before, the operation of consuming the surplus power in each motor generator MG lowers the motor drive efficiency, and thereby causes heat generation from the motors. Therefore, when the consumption quantity of the surplus power and the consuming operation time increase, the heat generated inside the motor may increase to raise the motor temperature excessively. Particularly, in the permanent magnet motor having permanent magnets attached to a rotor, when a magnetic force of the permanent magnet significantly lowers due to the demagnetization phenomenon caused by the temperature rising, the motor may not operate correctly. Therefore, when the surplus power consuming operation is being executed, the motors including another type of motors must be monitored so that the motor temperature may not enter the temperature range causing problems in view of the lowering of the motor properties and the element protection.

Figure 26:
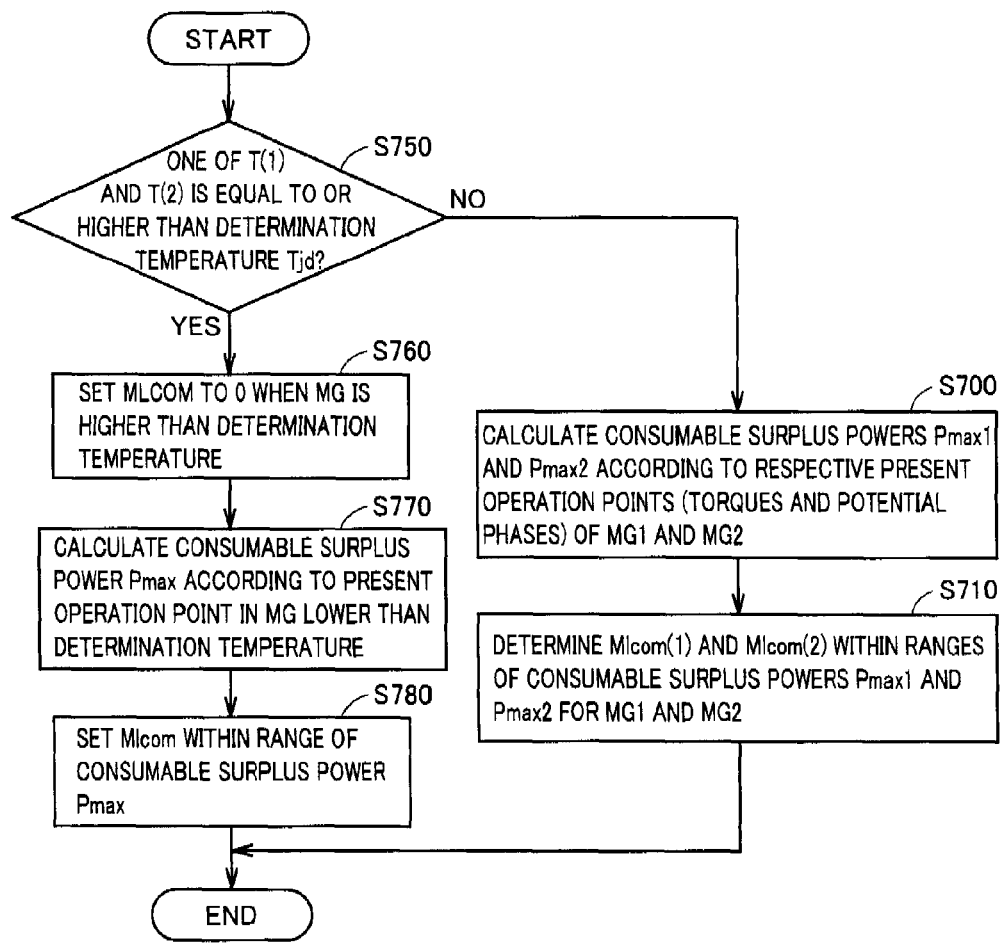
FIG. 26 is a flowchart illustrating a second example of the consumption surplus power distribution between the motor generators according to the fifth embodiment.

FIG. 26 shows a manner (second example) of determining the motor loss increase setting values in respective motor generators MG1 and MG2 reflecting the motor temperature.

Referring to FIG. 26, control device 50# determines in step S750 whether a motor temperature T(1) of motor generator MG1 or motor temperature T(2) of motor generator higher than a determination temperature Tjd or not.

Figure 27:
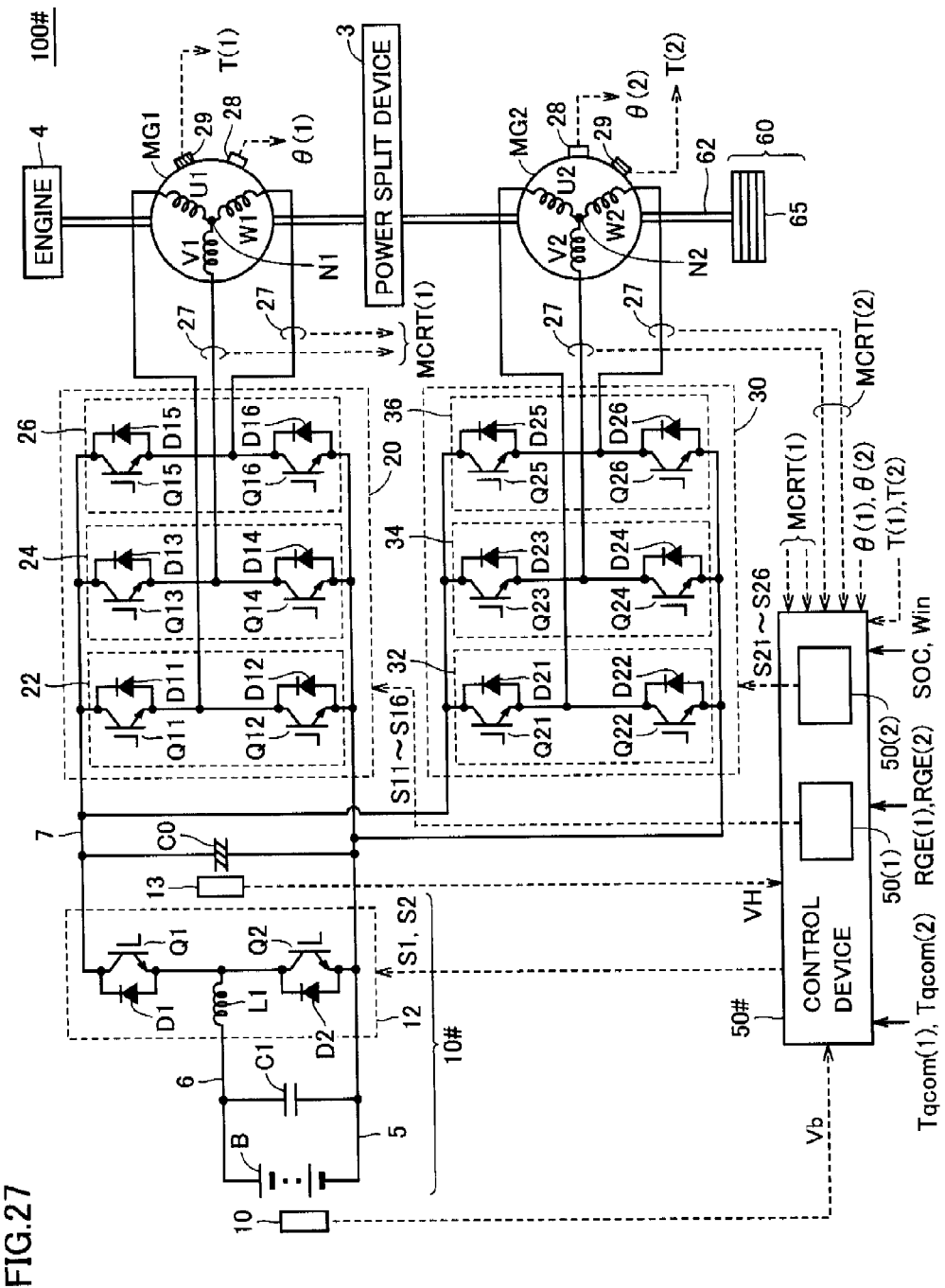
FIG. 27 shows a whole structure of a motor drive system having a structure in FIG. 21 and additionally provided with a temperature sensor.

Temperature sensors 29 arranged in motor generators MG1 and MG2 as shown in FIG. 27 detect motor temperatures T(1) and T(2), respectively. For measuring the temperature inside the motor, temperature sensor 29 particularly for the permanent magnet motor is arranged in a position where the rotor temperature can be detected. Thus, it is preferable that temperature sensor 29 is arranged in a position where the temperature tends to rise to the highest extent according to the motor characteristics, in view of the type and characteristics of the motor generator (AC motor). Structures in FIG. 27 other than temperature sensor 29 added thereto are substantially the same as those of the motor drive system shown in FIG. 21, and therefore description thereof is not repeated.

Referring to FIG. 26 again, it is preferable that determination temperature Tjd in step S750 is set relatively low according to the characteristics of the motor generators (AC motors) used in the system by providing a margin with respect to the temperature that causes changes in motor characteristics.

When both motor temperatures T(1) and T(2) are lower than determination temperature Tjd (NO in step S750), control device 50# performs the processing in steps S700 and S710 similar to those in FIGS. 23 and 25, and thereby distributes the consumption surplus power between motor generators MG1 and MG2 in view of the consumable surplus powers in respective motor generators MG1 and MG2.

Conversely, when one of motor temperatures T(1) and T(2) is equal to or higher than determination temperature Tjd (YES in step S750), control device 50# sets loss increase command Mlcom in motor generator MG (which generally represents motor generators MG1 and MG2 hereinafter) having the motor temperature equal to or higher than determination temperature Tjd to zero (Mlcom=0).

Further, in step S770, control device 50# performs processing similar to that in step S700 in FIG. 23 for motor generator MG having the motor temperature lower than determination temperature Tjd and, more specifically, calculates consumable surplus power Pmax at the present operation time point. Further, in step S780, control device 50# sets loss increase command Mlcom in motor generator MG to satisfy a relationship of (Mlcom≦Pmax) within the range of consumable surplus power obtained in step S770.

This control structure can successively monitor the temperature rising of the motor generator caused by the surplus power consumption, and thereby can avoid the surplus power consuming operation that may raise the motor temperature into a high temperature range causing changes in motor characteristics. Thereby, the operation of consuming the surplus power can be performed while avoiding stability in motor operation.

Further, from the viewpoint of reflecting the surplus power consuming operation in the motor temperature, it is possible to reflect the motor temperature in calculation (step S700 in FIG. 23 and others) of consumable surplus power Pmax in each motor generator. For example, consumable surplus power Pmax can be set lower than the original value according to the reduction in margins of motor temperatures T(1) and T(2) with respect to determination temperature Tjd.

(Distribution Manner in View of Time Required for Surplus Power Consumption)

As already described with reference to FIG. 3 and others, the surplus power consuming operation according to the embodiment is executed by changing the current operation point. This change in current operation point necessarily changes current command values Idcom and Iqcom. However, when the motor current changes significantly within a short time, the controllability deteriorates. Therefore, in view of the control stability, a certain limited value is generally employed for a change rate (a quantity of change per unit time) of the current command value. For example, current command producing unit 210 in FIG. 2 executes the current command producing operation in a cycle of a predetermined value, but the quantity of change of the current command value from the last current command value is restricted to or below a certain value when the current command is produced.

Figure 28:
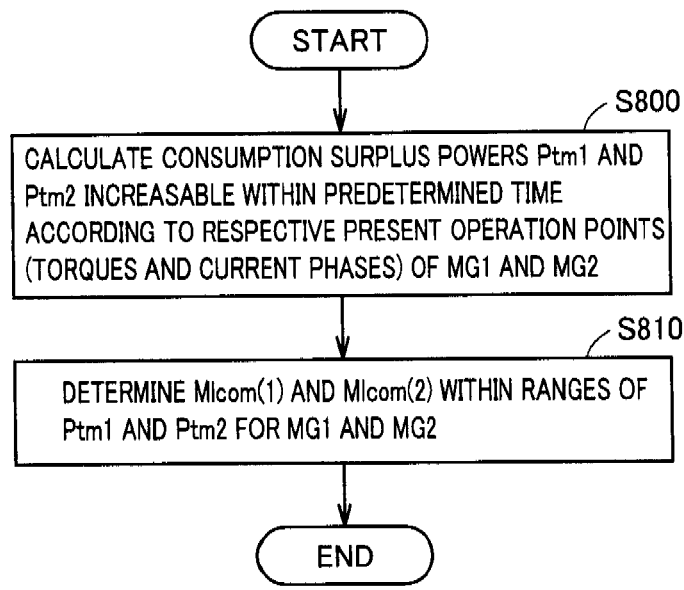
FIG. 28 is a flowchart illustrating a third example of the consumption surplus power distribution between the motor generators according to the fifth embodiment.

FIG. 28 illustrates a manner (third example) of determining the motor loss increase setting values in motor generators MG1 and MG2 in view of times required for consuming the surplus power.

Referring to FIG. 28, control device 50# calculates, in step S800, consumption surplus powers Ptm1 and Ptm2 by which the increase is allowed within a certain time in the present operation state and specifically in the present current state for motor generators MG1 and MG2, respectively.

Figure 29:
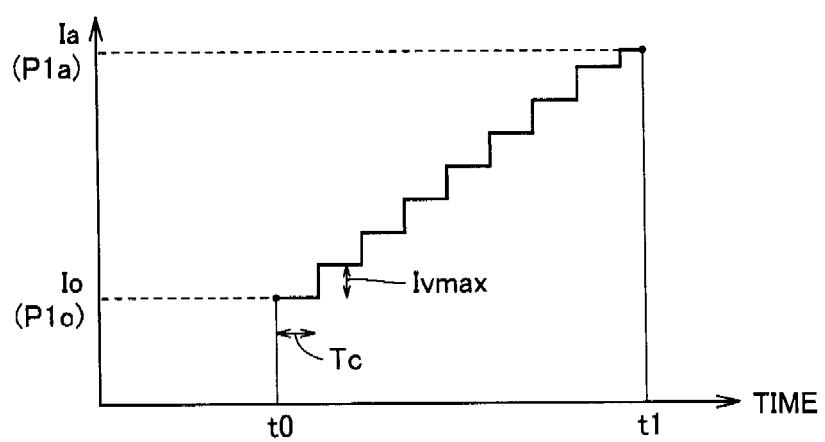
FIG. 29 is a conceptual diagram illustrating a time required for changing of the current command value according to a surplus power consuming operation.

As shown in FIG. 29, when the current command value is changed to a large extent, it is impossible to obtain immediately the desired current command value from the viewpoint of the motor control stability already described, and a certain time may be required for changing the value to the desired current operation point.

FIG. 29 illustrates, by way of example, a control operation performed when the current operation point changes from the present (time t0) current operation point P1o to a current operation point P1a for increasing the loss (surplus power consumption). In this operation, it is assumed that current command value Idcom or Iqcom changes from Io to Ia according to the change of the current operation point from P1o to P1a.

However, there is a change restriction value Ivmax of the current command value for each control period Tc. Therefore, in the case of ((Ia−Io)>Ivmax), it is impossible to produce the current command that immediately changes the current operation point to a desired position in the next control period, and it is necessary to change gradually the current operation point.

Therefore, when a large difference is present in current command value between current operation points P1o and P1a, a relatively long period is required for changing from the present current operation point to the current operation point to be set for the desired surplus power consumption (i.e., between times t0 and t1).

In other words, the consumption surplus power by which increase is allowed at each current operation point within a predetermined time can be calculated based on the value in the current command value table (FIG. 4) that is obtained in advance, while reflecting change restriction value Ivmax of the current command value.

Figures 30, 31:
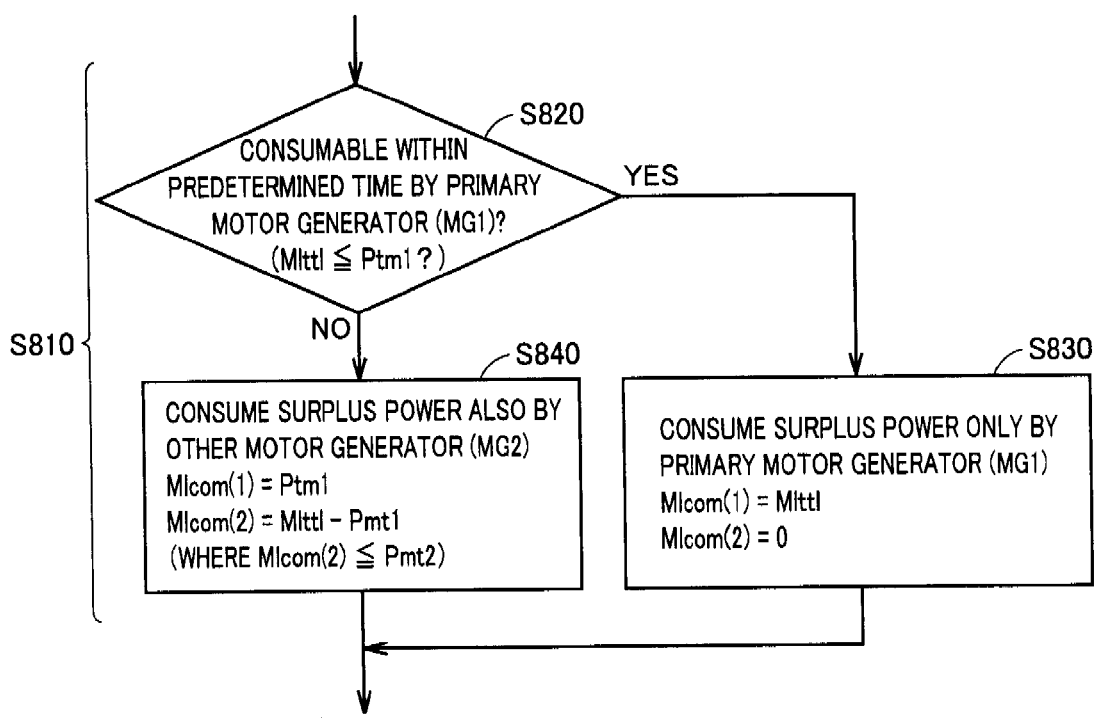
FIG. 30 illustrates a structural example of a table for obtaining a consumption surplus power that can be increased within a predetermined time by each motor generator.
FIG. 31 is a flowchart illustrating a further preferable control structure for the consumption surplus power distribution illustrated in FIG. 28.

Therefore, as illustrated in FIG. 30, it is possible to prepare in advance the table to which reference is made for the increasable consumption surplus power within a predetermined time for each current operation point. According to the processing in step S800 in FIG. 28, the reference is made to the table in FIG. 30, and thereby consumption surplus powers Ptm1 and Ptm2 by which increase is allowed within a predetermined time in the present operation state (current operation point) can be determined for motor generators MG1 and MG2, respectively.

Referring to FIG. 28 again, control device 50# determines, in step S810, loss increase commands Mlcom(1) and Mlttl(2) in motor generators MG1 and MG2 within ranges of Ptm1 and Ptm2 obtained in step S800.

According to the control structure described above, the surplus powers within ranges that allow the increase within a predetermined time can be distributed to the respective motor generators. Therefore, the surplus power of the whole system can be consumed within a short time according to the operation state (both the regenerative operation and the power running) of each motor generator.

The processing in step S810 may have a control structure that distributes the consumption surplus power by assigning the priorities similar to those in FIG. 25 to the motor generators as illustrated in FIG. 31.

Referring to FIG. 31, the processing in step S810 shown in FIG. 28 is preferably formed of steps S820-S840.

In step S820, control device 50# compares output loss increase quantity Mlttl corresponding to the surplus power of while motor generators MG1 and MG2 with consumption surplus power Ptm1 that is obtained in step S800 (FIG. 28) and is increasable within the predetermined time in motor generator MG1 to be operated primarily to consume the surplus power.

In the case of (Mlttl≦Ptm1) (YES in step S820), motor generator MG1 can consume the whole surplus power Mlttl within the predetermined time. Therefore, control device 50# distributes the consumption surplus power to consume the surplus power only by motor generator MG1 according to the following equation (9) in step S830:

$$Mlcom(1)=Mlttl, \text{ and } Mlcom(2)=0 \quad (9)$$

Conversely, in the case of (Mlttl>Ptm1) (NO in step S820), it is impossible to consume the whole surplus power within the predetermined time only by motor generator MG1 to be operated primarily to consume the surplus power. Therefore, the other motor generator MG2 must be additionally used for consuming the surplus power. Therefore, control device 50# distributes the consumption surplus power according to the following equation (10):

$$Mlcom(1)=Ptm1, \text{ and } Mlcom(2)=Mlttl-Ptm1 \quad (10)$$

(where Mlcom(2)≦Ptm2)

By employing the control structure shown in FIG. 31 in the hybrid car, it is possible to suppress the possibility that the surplus power consuming operation in the motor generators affects the vehicle drivability, similarly to the structure in FIG. 25.

Naturally, consumption surplus powers Ptm1 and Ptm2 by which increase is allowed within the predetermined time (see FIGS. 28 and 31) are equal to or smaller than consumable surplus powers Pmax1 and Pmax2 illustrated in FIG. 23, respectively (Ptm1≦Pmax1, and Ptm2≦Pmax2).

In the flowchart of FIG. 26, therefore, steps S800 and S810 in FIG. 28 or 31 may be executed instead of steps S700 and S710, and further processing similar to those in steps S800 and S810 may be performed instead of steps S770 and S780, whereby it is possible to provide the control structure that can consume the whole surplus power within a short time while keeping a balance in consumption surplus power between motor generators MG1 and MG2, and monitoring the excessive rising of the motor temperature.

A correlation between the invention and the structure exemplified as the fifth embodiment is as follows. Step S700 in FIG. 23 and step S800 in FIG. 28 correspond to the "upper limit setting means" in the invention, and step S710 in FIG. 23, steps S750-S780 in FIG. 26 and step S810 in FIG. 28 correspond to the "distribution determining means" in the invention.

In the fourth and fifth embodiments, the motor drive systems for the hybrid vehicle provided with motor generators MG1 and MG2 have been described as typical examples. However, the number of the motor generators (AC motors) in this type of motor drive system is not restricted to two. In the motor drive system provided with an arbitrary number of motor generators (AC motors), it is possible to execute the distribution of the consumption surplus power that reflects the consumable surplus power corresponding to the operation state or the consumption surplus power by which increase is allowed within a predetermined time as well as the motor temperature in each motor generator (AC motor), similarly to the fifth embodiment.

As the embodiments of the invention, the motor drive systems arranged in the hybrid vehicle or the electric car have been described by way of example, but the invention is not restricted to these cases. Thus, the motor drive system according to the invention can be applied to motor drive systems including an AC motor of which output is controlled by the feedback control of the motor current, without restricting the number of the AC motors subjected to the drive control. Particularly, the invention is appropriately applied to the motor drive system provided with the AC motor such as a permanent magnet motor or a reluctance motor which are configured to perform variable control of the output torque by changing the magnitude and the phase of the motor current.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A motor drive system for driving an AC motor, comprising:
   a motor drive circuit being capable of bidirectionally supplying and receiving a power to and from the AC motor, and supplying a drive power to said AC motor; and
   motor control means for controlling an operation of said motor drive circuit, wherein
   said motor control means performs a consuming operation of consuming a surplus power determined depending on a state of said motor drive system by said AC motor, and performs a follow-up operations of causing an output torque to follow changes in torque command value while keeping said consuming operation when said torque command value to said AC motor changes during said consuming operation.

2. The motor drive system according to claim 1, wherein said motor control means drives said AC motor with a current phase relatively lowering drive efficiency of said AC motor according to increase in the determined surplus power in said consuming operation.

3. The motor drive system according to claim 1, wherein said motor control means has power estimating means for estimating a power generated by said AC motor based on the a rotation angular speed of said AC motor and said torque command value, and determines said surplus power consumed by said consuming operation according to the generated power estimated by said power estimating means.

4. The motor drive system according to claim 1, wherein said motor drive circuit is capable of bidirectionally supplying and receiving the power to and from a rechargeable DC power supply,
   said motor drive system further comprises a voltage detector detecting a voltage on an interconnection electrically connecting said motor drive circuit and said DC power supply together, and
   said motor control means determines said surplus power consumed by said consuming operation according to the voltage detected by said voltage detecting means.

5. The motor drive system according to claim 1, wherein said AC motor is mounted on a vehicle, and an output shaft of said AC motor is connected to a wheel of said vehicle for torque transmission, and
   said motor control means determines said surplus power to be consumed by said consuming operation according to a braking force required in said vehicle.

6. The motor drive system according to claim 1, wherein said motor control means has characteristic storing means for storing in advance a correlation between said torque command value and a current command corresponding to said surplus power consumption of the same magnitude in said AC motor, and produces said current command according to said torque command value and the determined surplus power based on said correlation stored in said characteristic storing means.

7. The motor drive system according to claim 1, wherein said motor control means includes:
   loss increase setting means for setting a motor loss command indicating a power loss to be increased in said AC motor corresponding to the determined surplus power,
   current command producing means for producing a current command for a motor current passing through said AC motor according to said torque command value of said AC motor and said motor loss command determined based on said loss increase setting means, and current control means for controlling the operation of said motor drive circuit to generate said motor current in accordance with said current command produced by said current command producing means; and
   said current command producing means produces said current command such that the output torque of said AC motor matches with said torque command value and drive efficiency of said AC motor relatively lowers according to increase in said power loss caused by said motor loss command.

8. The motor drive system according to claim 7, wherein said motor control means further includes:
   rectangular wave voltage control means for controlling the operation of said motor drive circuit to apply a rectangular wave voltage of a phase depending on said torque command value to said AC motor,
   control mode selecting means for selecting one of said current control means and said rectangular wave voltage control means according to the operation state of said AC motor, and
   control mode correcting means for cancelling the selection by said control mode select means and selecting said current control means according to said motor loss command determined by said loss increase setting means when said control mode select means selects said rectangular wave voltage control means; and
   when said control mode correcting means selects said current control means, said current command producing means produces said current command in a region of drive efficiency of said AC motor lower than that achieved by the motor drive using said rectangular wave voltage control means.

9. The motor drive system according to claim 1, wherein said motor drive system drives a plurality of said AC motors,
   said motor drive circuit and said motor control means are arranged corresponding to each of said AC motors, and each of said motor drive circuits is capable of bidirectionally supplying and receiving the power to and from a rechargeable common power supply,
   said motor drive system further comprises distributing means for setting consumption surplus powers in said plurality of AC motors, respectively, such that a whole of said plurality of AC motors consumes said surplus power, and
   each of said motor control means controls corresponding one of said AC motors to perform the consuming operation of consuming corresponding one of said consumption surplus powers determined by said distributing means.

10. The motor drive system according to claim 9, wherein said distributing means includes:

upper limit setting means for calculating the consumable surplus powers of said plurality of AC motors, respectively, based on a present operation state in the corresponding AC motor, and, distribution determining means for setting the consumption surplus powers in respective said plurality of AC motors such that each of said consumption surplus powers is within a range of the corresponding consumable surplus power calculated by said upper limit setting means.

11. The motor drive system according to claim 9, wherein said distributing means includes distribution determining means for setting the consumption surplus powers in said plurality of AC motors, respectively, in view of temperatures of said plurality of AC motors.

12. The motor drive system according to claim 9, wherein said distributing means includes:

upper limit setting means for calculating, for respective said AC motors, the surplus powers each being consumable within a predetermined time based on a present operation state of the corresponding AC motor and distribution determining means for setting the consumption surplus powers in respective said AC motors such that each of said consumption surplus powers is within a range of the corresponding surplus power being consumable within the predetermined time calculated by said upper limit setting means.

13. The motor drive system according to any one of the preceding claims 9 to 12, wherein said plurality of AC motors include:

a drive motor generating a wheel drive force of a vehicle, and a non-drive motor not directly generating said wheel drive power; and said distributing means sets consumption surplus powers in said respective AC motors such that said non-drive motor consumes the surplus power on a priority basis.

\* \* \* \* \*